(12) United States Patent
Gisby et al.

(10) Patent No.: US 8,000,712 B2
(45) Date of Patent: *Aug. 16, 2011

(54) CLIENT DEVICE METHOD AND APPARATUS FOR ROUTING A CALL

(75) Inventors: Doug Gisby, Atlanta, GA (US); Michael Gray, Glen Ridge, NJ (US); Shen-Yuan Yap, Woodland Hills, CA (US); Michael S. Colbert, Debary, FL (US); Robert J. James, Jr., Half Moon Bay, CA (US)

(73) Assignee: Ascendent Telecommunications, Inc., Redwood City, CA (US)

( * ) Notice: Subject to any disclaimer, the term of this patent is extended or adjusted under 35 U.S.C. 154(b) by 909 days.

This patent is subject to a terminal disclaimer.

(21) Appl. No.: 11/875,278

(22) Filed: Oct. 19, 2007

(65) Prior Publication Data

US 2008/0139210 A1 Jun. 12, 2008

Related U.S. Application Data

(60) Provisional application No. 60/852,639, filed on Oct. 19, 2006.

(51) Int. Cl.
*H04W 88/02* (2009.01)
(52) U.S. Cl. ..................................... 455/445

(58) Field of Classification Search .................. 455/413, 455/445, 558, 455, 555; 370/254, 352, 401, 370/255, 328; 379/201.01, 201.2
See application file for complete search history.

(56) References Cited

U.S. PATENT DOCUMENTS

| | | | |
|---|---|---|---|
| 6,721,412 B1 | 4/2004 | Youngs | |
| 6,839,421 B2 | 1/2005 | Ferraro Esparza et al. | |
| 6,993,360 B2 | 1/2006 | Plahte et al. | |
| 7,643,446 B2 * | 1/2010 | Chu | 370/328 |
| 7,680,511 B2 * | 3/2010 | Forte | 455/555 |
| 2002/0098831 A1 | 7/2002 | Castell et al. | |
| 2003/0128693 A1 | 7/2003 | Segal | |
| 2003/0181209 A1 | 9/2003 | Forte | |
| 2005/0058125 A1 | 3/2005 | Mutikainen et al. | |
| 2005/0195762 A1 | 9/2005 | Longoni et al. | |
| 2006/0133582 A1 | 6/2006 | McCulloch | |
| 2006/0147013 A1 | 7/2006 | Baumeister et al. | |
| 2006/0229078 A1 | 10/2006 | Itzkovitz et al. | |
| 2007/0091826 A1 * | 4/2007 | Chandra et al. | 370/255 |
| 2008/0096570 A1 * | 4/2008 | Chu | 455/445 |
| 2008/0130554 A1 * | 6/2008 | Gisby et al. | 370/328 |

* cited by examiner

*Primary Examiner* — Diane Mizrahi
(74) *Attorney, Agent, or Firm* — Norton Rose or LLP

(57) ABSTRACT

A telecommunication method, server and system that route an outbound telephone communication initiated by a wireless remote device through an enterprise communication network. The system also routes an incoming call to a device associated with an enterprise communication network to a plurality of telephony devices including wireless devices and other remote devices.

16 Claims, 24 Drawing Sheets

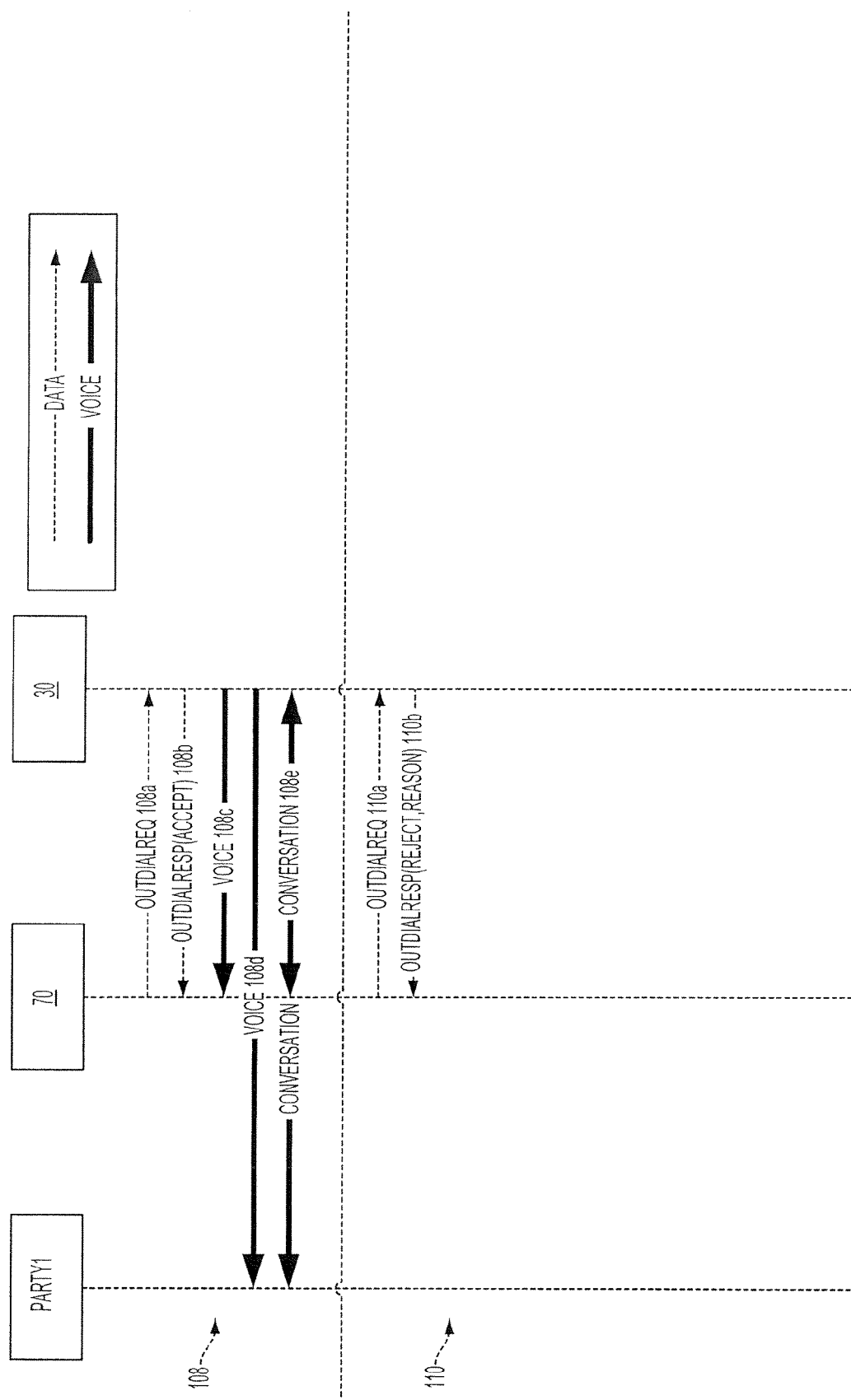

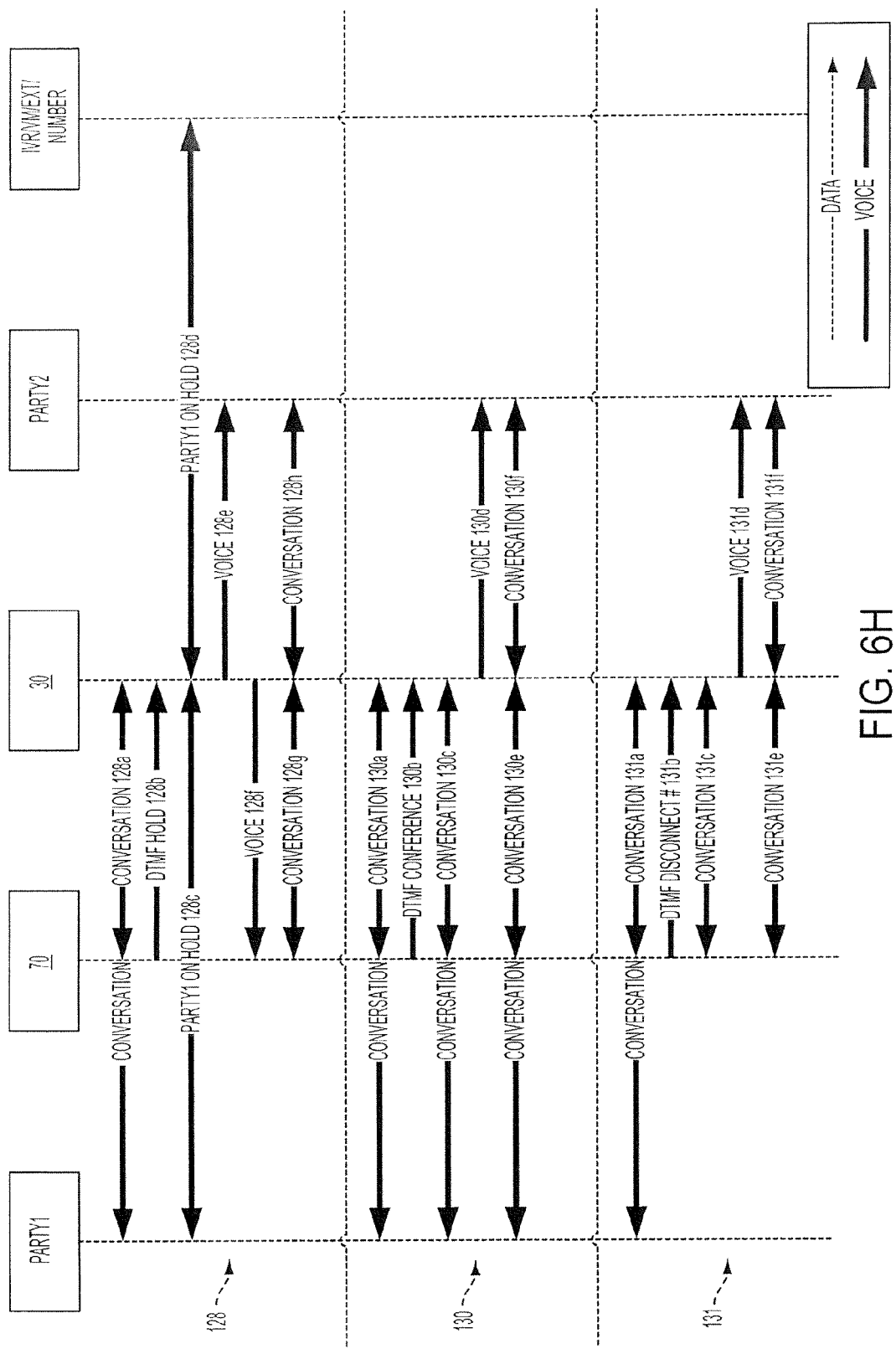

CLIENT DEVICE METHOD AND APPARATUS FOR ROUTING A CALL

This application claims priority to U.S. provisional application No. 60/852,639, filed on Oct. 19, 2006, which is hereby incorporated by references in its entirety.

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

BACKGROUND OF THE INVENTION

It has become relatively common for individuals to possess a number of different devices through which they communicate. For example, a person may have a home telephone, a wireless telephone, a pager, a personal digital assistant (PDA), and an office telephone to name a few. As the population becomes increasingly mobile, making contact with a person through one of these communication devices has become more difficult.

Call forwarding is one method of addressing this problem. Certain telephone systems allow users to enter another number to which a call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding.

A significant drawback to this forwarding strategy is that, in each leg of the forwarded call, the calling party is terminated on the last device or network in the chain. It follows that the final number in the forwarding scheme is responsible for all available enhanced services or voicemail available to the caller. Accordingly, although a call may have been initially placed to an office telephone equipped with voicemail and/or operator assist, all such enhanced services of the corporate network are lost once the call is forwarded off the corporate PBX (e.g., to the user's wireless telephone).

Travel can also exacerbate the difficulty of establishing communication with an individual having access to multiple telephone devices. Upon checking into a hotel, the telephone in a traveler's hotel room becomes available as yet another potential means of contact. Unfortunately, this forces a calling party to decide whether to attempt to contact the traveler through his or her room telephone or other telephone device (e.g., wireless telephone or pager). If the traveler does not answer the called telephone, the calling party then must decide whether to leave a message (unaware of when, or if, the message will be retrieved) or instead attempt to reach the traveler via his or her other telephone.

Likewise, if the traveler is expecting an important call but is unsure whether it will be placed to his room telephone or wireless telephone, the traveler may feel compelled to remain within his room until the call has been received. In addition, if the traveler's wireless telephone does not support certain types of long distance calls (e.g., to various foreign countries), the traveler may be able to place certain types of calls only from his or her hotel room. The same problems arise when the traveler visits another office or enterprise having their own enterprise telecommunications network.

The office telephone is the primary point of contact of most business people. Typically, corporations invest significantly in their office telephone infrastructure, which often includes voicemail, paging and unified messaging systems. In addition, most corporations have negotiated contracts with their telephone carriers (e.g., local and long distance carriers) to ensure that they obtain the lowest possible rates for calls placed via their corporate network. However, because the corporate workforce is becoming increasingly mobile, more business people are using wireless telephones or devices to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., interoffice voicemail, direct extension dialing, etc.) that corporate users have come to expect in the office environment.

Often times, one must communicate with a particular individual and cannot wait until the individual completes the current call. This is sometimes referred to as Multi-level Precedence and Preemption (MLPP), but is referred to herein as "priority preemption." Priority preemption, however, is limited to the telephones connected to the enterprise network, which limits the ability of the higher ranking official to contact the appropriate individual (who may also be a high ranking officer or government official) when the need arises. It is desirable to extend the priority preemption capability to wireless and remote devices so that priority users are able to preempt existing communications and communicate with certain individuals even though that individual is using a wireless telephone or other remote device.

BRIEF DESCRIPTION OF THE DRAWINGS

FIGS. 6A-6H show line flow diagrams illustrating various operations performed by embodiments disclosed herein.

DETAILED DESCRIPTION OF THE INVENTION

Figure 1:
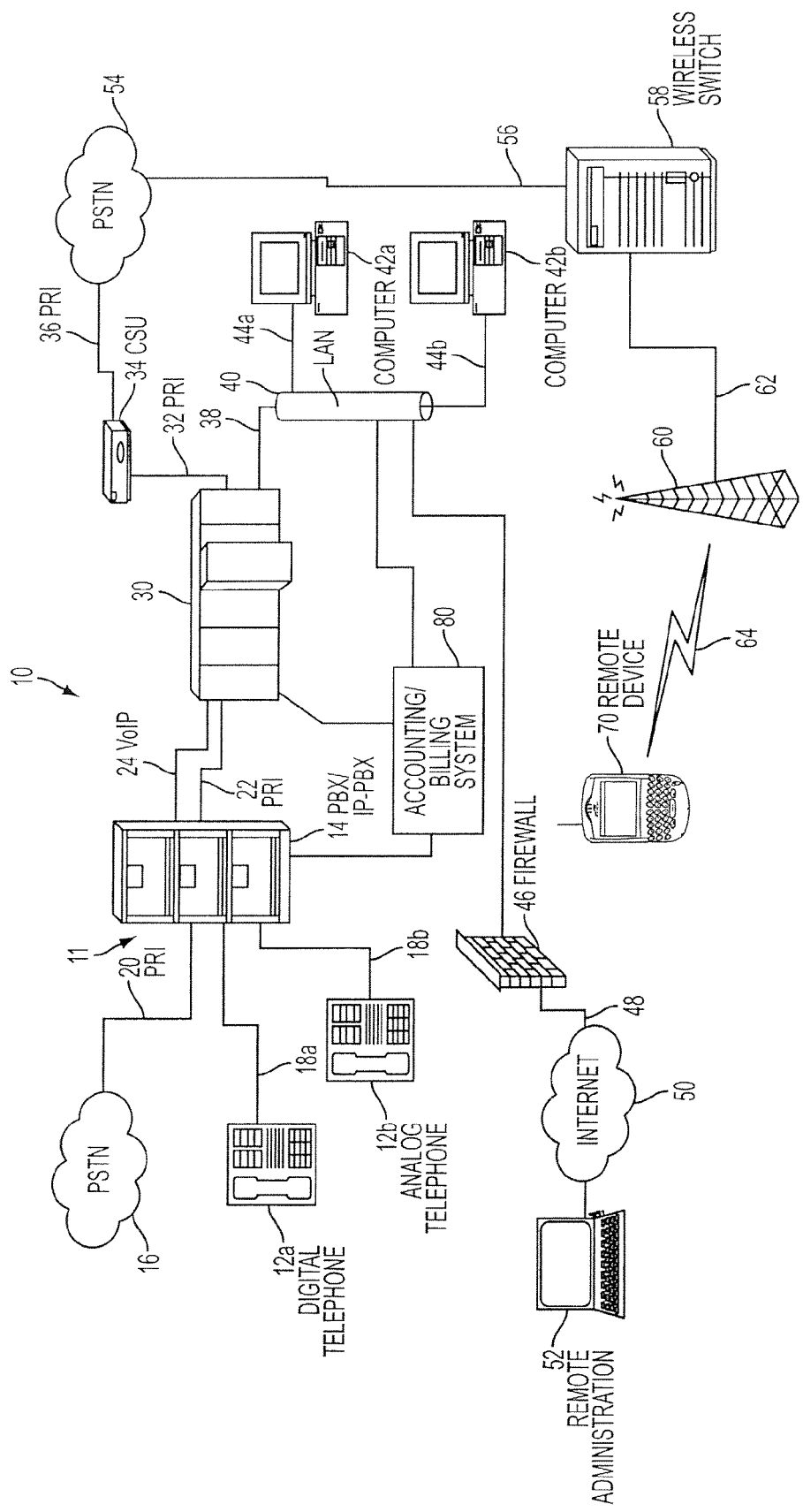
FIG. 1 illustrates an example of a telecommunication system constructed in accordance with an embodiment disclosed herein.

Example embodiments and applications will now be described. It should be appreciated that other embodiments may be realized and structural or logical changes may be made. Although the embodiments disclosed herein have been particularly described as applied to a business or office environment, it should be readily apparent that the embodiments may be embodied for any use or application having the same or similar problems.

Embodiments disclosed herein relate to a telecommunication system that can selectively establish communications with one of a plurality of telephony devices associated with a particular telephone number or other addressing method such as SIP URI or private numbering plan (PNP) (e.g., extension dialing). Moreover, the system allows remote devices to perform as a functional standard office telephone for both inbound and outbound communications. The system also has a processor configured to send a data signal via e.g., electronic mail (email), text messaging, or other forms of data communications to one or more remote devices without any user interaction. The data signal causes a processor and a remote device to execute a series of steps designed to route incoming and outgoing calls based on user preferences and perform PBX functions from the remote device.

In one embodiment, a method of routing an outbound communication initiated by a wireless device through an enterprise communication network is provided. The method comprises the steps of registering the wireless device with a server associated with the enterprise communication network; inputting a first data signal from the registered wireless device, the first data signal comprising a first device indicator of an intended recipient device of the outbound communication; translating the first device indicator into a first address suitable for establishing a first communication path with the intended recipient device; establishing the first communication path using the first address; establishing a second communication path to the wireless device; and connecting the first and second communication paths to route the outbound communication from the wireless device to the recipient.

In another example embodiment, a method of routing a communication is provided. The method comprises the steps of receiving over a first communication path an incoming call to a primary device telephony address; translating the primary device telephony address into a first connection indicator for a remote device associated with said primary device telephony address; transmitting a first data signal to the remote device, the data signal inquiring whether the incoming call is to be accepted at the remote device; receiving a second data signal from the remote device; determining whether the incoming call is accepted based on the second data signal; and if the incoming call is accepted, establishing a second communication path to the remote device using the first connection number and connecting the first and second paths such that the incoming call is routed to the remote device.

In a further example embodiment, a telecommunications server comprising a processor is provided. The processor is adapted to route an outbound communication initiated by a wireless device through an enterprise communication network by: registering the wireless device with a server associated with the enterprise communication network; inputting a first data signal from the registered wireless device, the first data signal comprising a first device indicator of an intended recipient device of the outbound communication; translating the first device indicator into a first address suitable for establishing a first communication path with the intended recipient device; establishing the first communication path using the first address; establishing a second communication path to the wireless device; and connecting the first and second communication paths to route the outbound communication from the wireless device to the recipient.

In yet another embodiment, another telecommunications server is provided. The server comprises a processor that is adapted to route a communication by receiving over a first communication path an incoming call to a primary device telephony address; translating the primary device telephony address into a first connection indicator for a remote device associated with said primary device telephony address; transmitting a first data signal to the remote device, the data signal inquiring whether the incoming call is to be accepted at the remote device; receiving a second data signal from the remote device; determining whether the incoming call is accepted based on the second data signal; and if the incoming call is accepted, establishing a second communication path to the remote device using the first connection number and connecting the first and second paths such that the incoming call is routed to the remote device.

A first example embodiment is discussed and illustrated with reference to its implementation within an office building, multiple office buildings or other enterprise establishment. In an office building, for example, personnel are assigned to offices (or cubicles) with each office having an associated telephone. The office telephones are typically connected to a PBX, exchange, or other call processing infrastructure one example being but not limited to a virtual PBX (also known as Hosted Enterprise Services (HES): a next generation network (NGN) application whereby the NGN hosts all originating and/or terminating business communication capabilities for enterprise users that are directly attached to NGN and have an IMS service subscription for this application in the NGN) hosted on a 3GPP IMS system or TISPAN NGN (e.g., specifications ECMA TR/91 and TR/92), etc. PBXs allow each office telephone to have one or more telephone extensions and a direct inward dial (DID) telephone number. As known in the art, a telephone extension is typically a three, four or five digit telephone number (i.e., a Private Numbering Plan (PNP)) where station-to-station (i.e., office-to-office) calls can be placed by dialing the three, four or five digit extension. This is commonly referred to as direct extension dialing. As also known in the art, a DID telephone number allows external calls (i.e., calls initiated outside of the office PBX) to be placed directly to the office telephone.

The embodiments disclosed herein are not to be limited to any particular environment. The embodiments may be implemented, for example, in a hotel, boarding house, dormitory, apartment, or other commercial or residential establishment, where individuals are assigned to a unique extension or DID telephone number. The term "office" as used herein encompasses a singular room or space within a business, other enterprise, hotel room or similar facility. The term "user" as used herein encompasses office personnel, hotel guests or other individuals associated with a telephone extension and DID telephone number.

Figure 8:
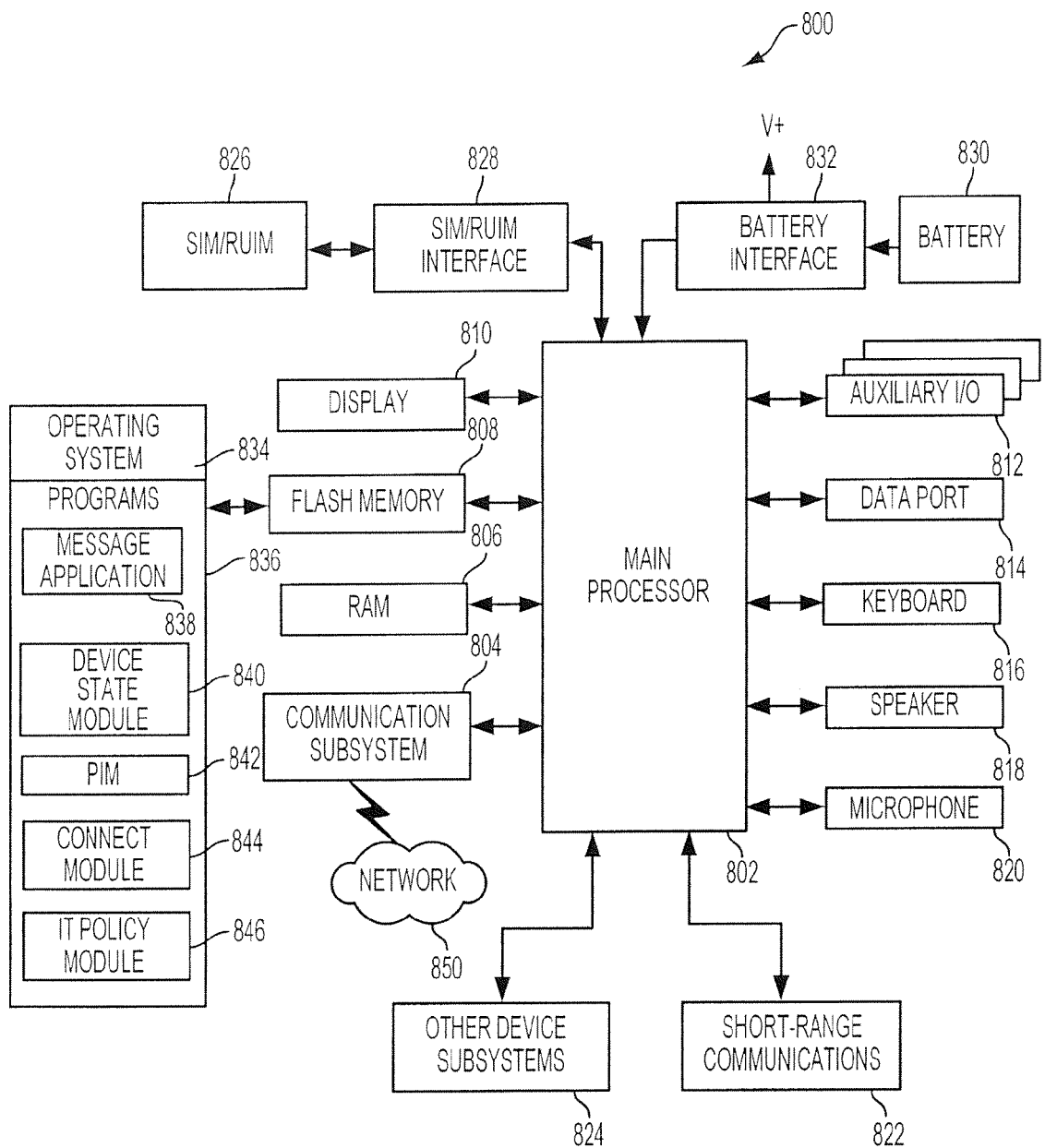
FIG. 8 is a block diagram of an exemplary mobile device constructed in accordance with an embodiment disclosed herein.

FIG. 1 illustrates a telecommunication system 10 constructed in accordance with an embodiment. As will be discussed below, the system 10 provides for a full integration of remote telephony devices, such as a remote device 70 (shown in this example as a personal digital assistant (PDA) with wireless voice and data communications (also referred to herein as a mobile device)), into an office, enterprise or hotel PBX or other communications network. The remote device 70 may be any suitable wirelessly enabled handheld remote device. The remote device 70 may operate over multiple types of radio communications technology such as GSM, UMTS, CDMA, WiFi, and/or WIMAX and support multiple protocol suites for data and voice communications associated with the various radio technology. The remote device may support (implement) more than one radio technology and offer both data and voice communication capabilities, simultaneously using two radio services (i.e., WiFi, GSM, etc.) and/or types (e.g., circuit or packet switched transmissions), for example a Blackberry supporting GSM/GPRS and WiFi. The device 800 described in further detail below in relation to FIG. 8 is an example of a remote device. Such devices include Blackberry™ devices by Research In Motion Limited of Ontario, Canada, or Palm® Treo™ devices by Palm, Inc. of California, U.S.A. to name a few. In addition, the remote device 70 may be a cellular telephone, or data only handheld which only supports VoIP.

The system 10 can selectively establish communications with one of a plurality of devices, including one or more remote devices 70, associated with a particular telephone extension or DID telephone number. Moreover, the system 10 will allow remote devices 70 such as a mobile device (described below in more detail) to perform functions of a standard office telephone 12a, 12b for both inbound and outbound communications. That is, a remote device 70 will be able to use features of the office network (e.g., direct extension dialing, corporate dialing plan, enterprise voicemail etc.) even though the device is not within the confines of the office or not directly connected to the office PBX. The system 10 also allows the remote device 70 to operate as an independent PDA, wireless telephone, etc. if so desired. That is, the remote device 70 may receive calls placed to its (non-office) DID telephone number even though the system 10 also routes PBX calls to the device 70. In addition, the system 10 essentially implements all or part of call management or other signaling protocol functions typically available on a device that is part of an office, enterprise or hotel PBX/IP-PBX or other communications network. Some of these features are discussed in detail below.

The system 10 as particularly illustrated herein includes a conventional office PBX network 11. The PBX network 11 may include a plurality of standard telephones 12a, 12b respectively connected to a conventional PBX/IP-PBX 14 via communication lines 18a, 18b. Although PBX network 11 may use a PBX or IP-PBX 14, the following disclosure will simply refer to PBX 14 for convenience purposes. The PBX 14 is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, the embodiments described herein are not to be limited to the particular type of telephone used in the system 10.

The PBX 14 is coupled to a server 30 constructed in accordance with an embodiment of the invention (discussed in more detail below). The server 30 is connected to the PBX 14 in this embodiment by a PRI connection 22, VoIP connection 24 (e.g., SIP and other proprietary protocols) (if PBX 14 is an IP-PBX), or other suitable communication medium (e.g., WiFi connection). The server 30 is also connected to a PSTN 54 by a PRI connection or other suitable digital communication medium. The illustrated PRI connection between the server 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the server 30 and the PSTN 54 is one of many suitable connections. Accordingly, embodiments described herein should not be limited to the illustrated connection. The server 30 is one of the mechanisms that allows the integration of remote devices (e.g., mobile device 70) into the PBX network 11 and its operation will be described below in more detail. Moreover, as will become apparent from the various call flow processes described in detail below, the server 30 maintains control over inbound, outgoing and in-progress calls and communications.

The server 30 is preferably connected to a local area network (LAN) 40 by an appropriate communication medium 38. Although a LAN 40 is illustrated, it should be appreciated that any other network, be it wired or wireless or a combination thereof, could be used. A plurality of computers (e.g., 42a, 42b) may be respectively connected to the LAN 40 by any appropriate communication lines 44a, 44b. The computers 42a, 42b can be used by network administrators or others to maintain server 30 and other portions of the system 10. The LAN 40 may also be connected to the Internet 50 by a suitable communication medium 48. A firewall 46 may be used for security purposes. In accordance with an embodiment, Internet 50 can be used to allow a remote administration device 52 (e.g., a personal computer) to perform remote administration of server 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless remote device 70. The wireless remote device could also be a wireless telephone, cellular telephone, or other wireless communication device. It may be desirable for the remote device 70 to be capable of handling both (or either) digital and analog communication signals. It should be noted that any type of wireless communication protocol (or a combination of different protocols), such as TDMA, CDMA, GSM, AMPS, MSR, iDEN, WAP, WiFi, etc., could be used.

It should be appreciated that the server 30 is connected to a wireless carrier through a PSTN 54 and/or data network (e.g., WLAN) and not by unique hardware or an in-office cellular network. As a result, server 30 only has to interface with conventional components, such as the PBX 14 and PSTN 54. Thus, the system 10 is substantially technology independent. Moreover, special wireless devices are not required, which allows the remote device to function in its conventional manner (e.g., as a separate mobile device) and as part of the PBX network 11 (if so desired). The PSTN 54 e.g., will send calls placed to the DID phone numbers associated with the PBX extensions to the server 30 where the server 30 resolves the called number and performs the call processing described below.

The server 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the remote device 70 or other remote device. This immediate billing feature is not present in other PBX or enterprise networks and is particularly useful for corporate environments such as law firms and government agencies, and hotel environments, where up to date billing information is essential.

As noted above, the server 30 allows for the full integration of remote devices into the PBX network 1. In accordance with an embodiment, server 30 is a processor-based stand-alone unit capable of handling communications directed to the PBX network 11. In a first embodiment, shown in FIG. 2, server 30 comprises a plurality of receiving and transmitting modules 220a, 220b, 220c, first and second buses 275, 285, at least one processor module (Obj) 250, a network interface card 240 and a memory module operable to comprise a database 270 such as for example, a relational database management system (RDBMS). Further, server 30 can include a web-based user interface (UI) processor module 265, a SIP proxy server module 280 and a plurality of flop files 290a, 290b, 290c. The processor, UI and SIP proxy server modules 250, 265, 280 can be implemented, separately or together, as one or more processor cards (example hardware components of these cards are described below in more detail with reference to FIG. 4) containing source code, object modules, scripts, or other programming to perform the following functions.

The SIP proxy server module 280 receives session initiation protocol (SIP) messages from user agents and acts on their behalf in forwarding or responding to those messages. In essence, the SIP proxy server module 280 is a gateway for IP-based interfaces to the server 30. The SIP proxy server module 280 also adds services, features and scalability to SIP networks. The SIP proxy server module 280 typically includes a registration service and a SIP location database, in addition to the SIP proxy function.

Server 30 can receive an incoming call 210 and/or place an outgoing call 215 (described below in more detail). The processor module 250, among other things, directs and instructs the call processing of the server 30. The memory module comprising database 270 is used for storing user preferences and other pertinent information and may be a separate card or included within one of the other modules. The memory module may also be located external to the server 30, if desired, and connected to the server 30 by any wired or wireless communication medium.

Figure 4:
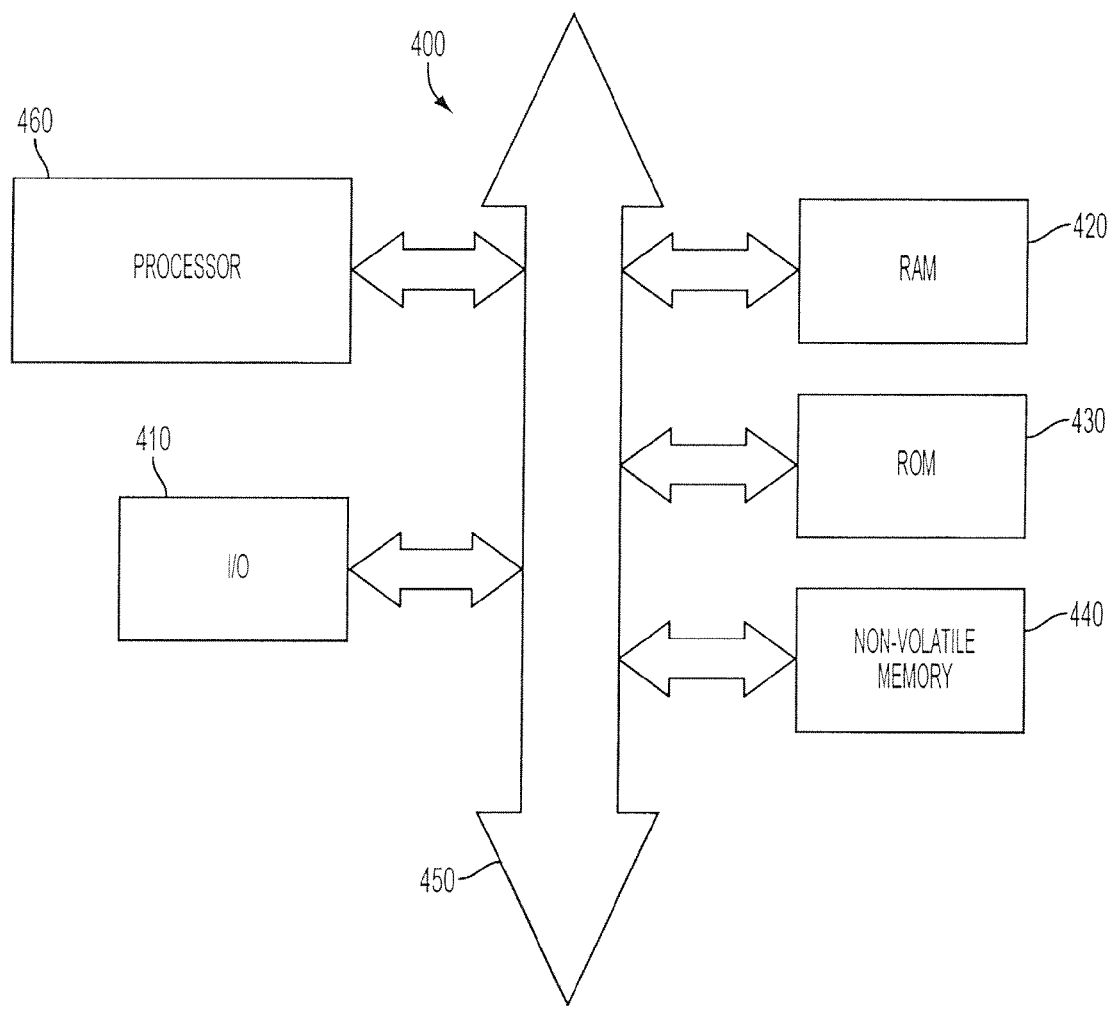
FIG. 4 illustrates a processor module in accordance with an embodiment disclosed herein.

FIG. 4 illustrates an example processor card 400, which may be used for the processor, UI and SIP proxy server modules 250, 265, 280. The card 400 includes a processor 460 for executing the processes of processor module 250 (or the other modules) that communicates with various other devices of the card over a bus 450. These devices may include random access memory (RAM) 420, read-only memory (ROM) 430 and non-volatile memory 440. An input/output device (I/O) 410 provides communication into and out of the card 400. While one input/output device 410 is shown, there may be multiple I/O devices included on the card as desired. Source code, or other programming, comprising applications required by or performed by the disclosed embodiments may be stored on one of the computer readable storage media on the card 400 (e.g., ROM 430, non-volatile memory 440) and executed by the processor.

Figure 2:
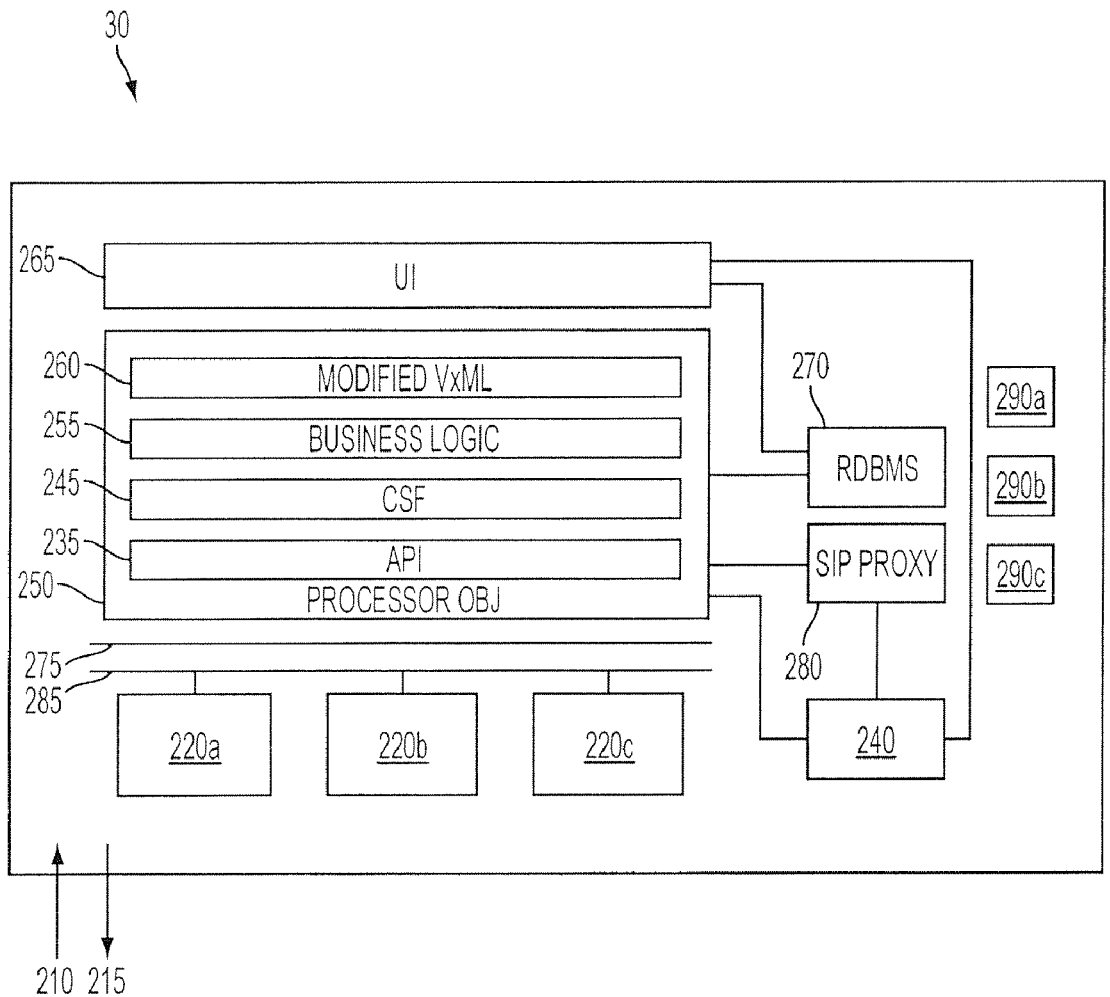
FIG. 2 illustrates a server unit in accordance with an embodiment disclosed herein.

Referring now to FIG. 2 and FIG. 4, the processor module 250 executes one or more computer programs or applications (Obj) stored in one or more memory units within (e.g., as shown in FIG. 4) or coupled to the processor module 250. Processor module 250 can include one or more processes such as a modified VxML 260 call flow process, business logic process 255, call service function (CSF) process 245, and a global application processing interface (API) process 235. It should be appreciated that processor module 250 can include one, all, or any combination of the processes described. The processor module 250 may also contain one or more additional databases and/or other processing memory used during the overall operation of system 10.

In one embodiment, the business logic process 255 can be used for determining whether or not a calling party (incoming or outgoing) is a participant of the server 30 network and allows the server 30 to be flexibly configured by providing routing plans and route translations, Interactive Voice Response (IVR) prompting and announcements, data manipulation, management and control. In another embodiment, the business logic 255 provides an intelligent call routing function (described below in more detail). The UI module 265 includes processes that provide an easy, but powerful, user interface to administer, configure and manage applications including the management of system, user, conference, notification, IVR and voicemail applications, to name a few.

Figure 3:
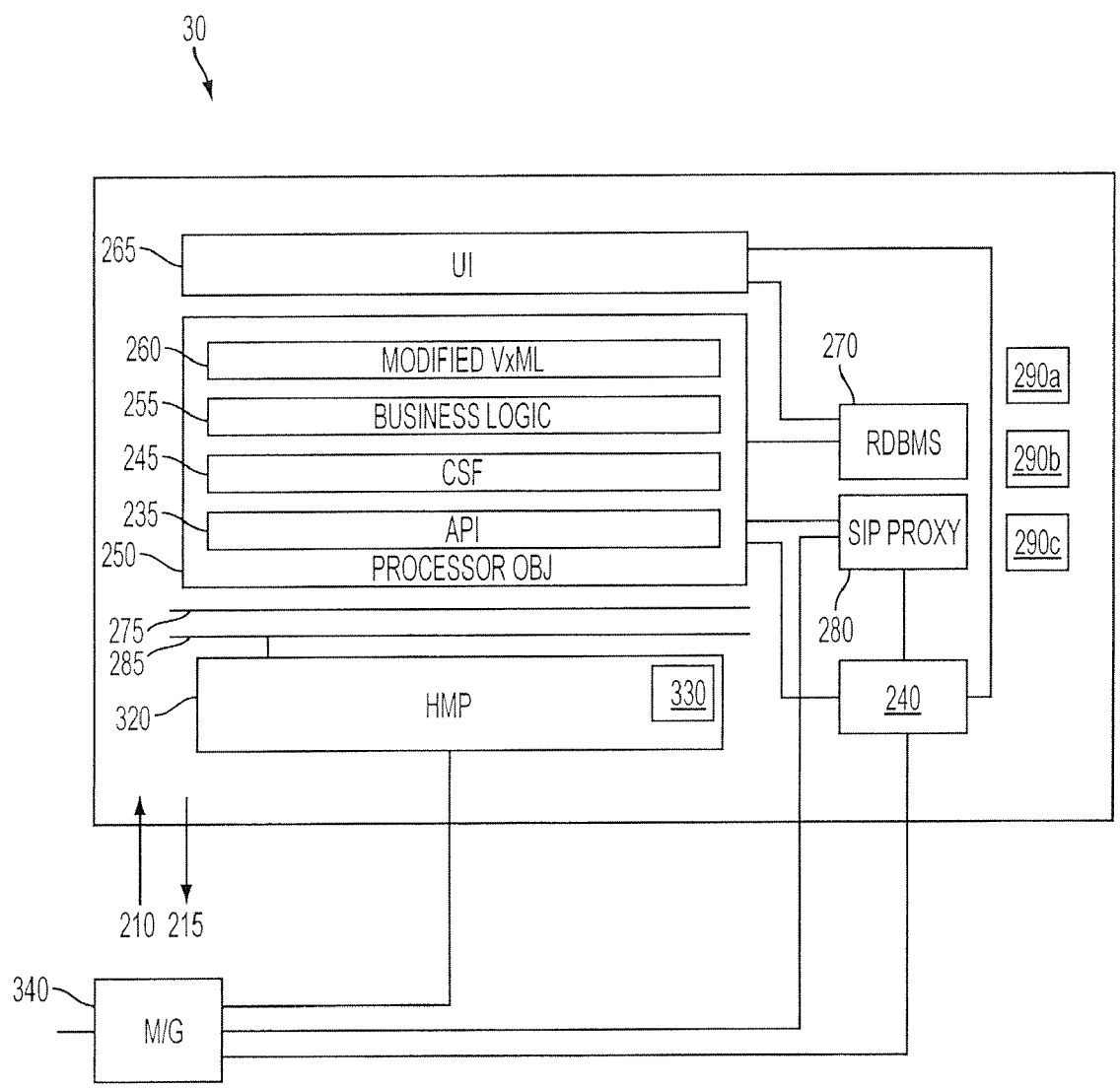
FIG. 3 illustrates a server unit in accordance with another embodiment disclosed herein.

The plurality of receiving and transmitting modules 220a, 220b, 220c communicate with and handle incoming and outgoing telephone calls and are connected along bus 285. In one embodiment, bus 285 is an H100 or similar bus. The receiving and transmitting modules 220a, 220b, 220c may be telephonic cards such as e.g., Intel Dialogic cards, that communicate with processor module 250, database 270 and other components via bus 275 (for example, a PCI bus), which is bridged to bus 285 (bridge not shown), and are employed to receive and transmit information to the PBX 14 and PSTN 54 during call processing. The modules 220a, 220b, 220c also receive and transmit other information such as administrative information. In another embodiment as shown in FIG. 3, the receiving and transmitting modules 220a, 220b, 220c can also be implemented as a processor module 320 such as e.g., a Host Media Processing (HMP) processor having a memory 330 comprising a program that, when executed, causes the processor 320 to perform the desired telephony functions.

In one embodiment, the workload performed by the receiving and transmitting modules 220a, 220b, 220c, as well as some of the processing functions of processor module 250, are implemented using one or more conventional processor-based programmable telephony interface circuit cards (e.g., Intel Dialogic cards) used to interface server 30 with PBX 14 and the PSTN. The cards are programmed to perform the conventional telephony services required to place and receive calls, as well as being programmed to perform the unique call processing functions described below.

The server 30 preferably contains a database of office extension numbers (also referred to herein as PBX extensions) and DID telephone numbers associated with each existing PBX extension, the DID numbers being associated with one or more devices including one or more remote devices 70. The database will be stored on a computer readable storage medium, which may be part of (e.g., database 270) or connected to the server 30. The database may also contain a server-to-PBX extension (hereinafter referred to as a "SERVER-PBX extension") and one or more remote device telephone numbers associated with each PBX extension. In the illustrated embodiment, software running on the telephony modules 220*a*, 220*b*, 220*c* interfaces with the database to perform the various call processing functions discussed below.

In the embodiment illustrated in FIG. 1, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the server 30 over the PRI 22 and VoIP 24 connections between the server 30 and the PBX 14. In addition, the CDP steering table of the PBX 14 directs the routing of all SERVER-PBX extensions received from the server 30 to the appropriate office telephone.

Figure 5A:
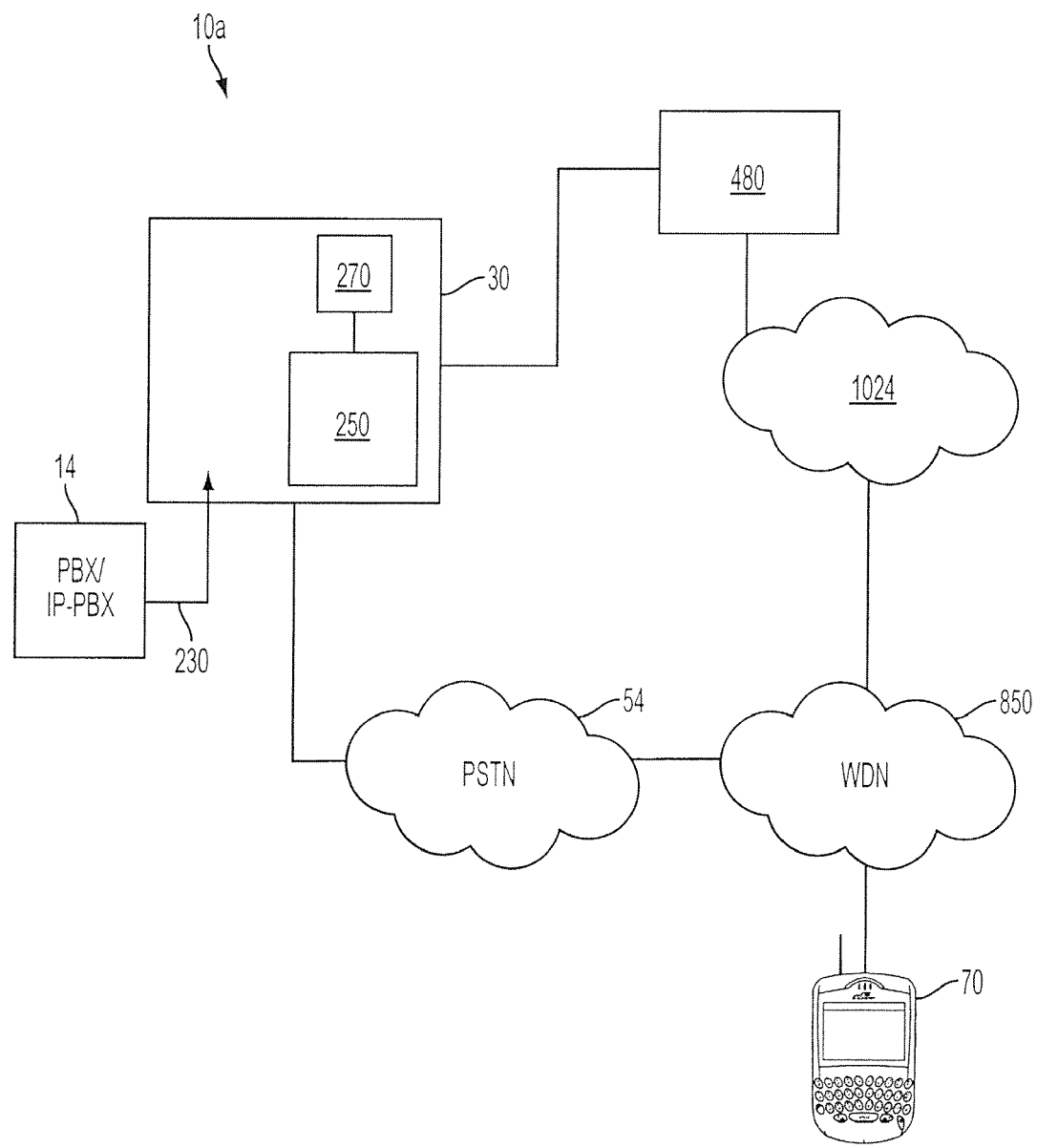
FIG. 5A illustrates another telecommunication system constructed in accordance with an embodiment disclosed herein.

FIG. 5A illustrates another example of a telecommunication system 10*a* constructed in accordance with another embodiment of the invention. System 10*a* comprises PBX 14, which is connected to server 30, including processor module 250 and database 270, via a PRI connection 230. As stated above, PBX 14 could also be an IP-PBX and thus, there can also be a VoIP connection between the server 30 and PBX 14. There can also be a wireless connection (e.g., WiFi) if desired. That is, the illustrated embodiment can use wireless cellular connections (i.e., circuit switched) and data connections (i.e., packet switched) in addition to the connections illustrated and discussed above. Server 30 also includes components from FIG. 2 or 3 as desired, but the components are not illustrated for convenience purposes. Server 30 is connected to remote device 70 via host system 480, network 1024 and wireless network (WDN) 850 (all of which are described in more detail below with respect to FIGS. 10 and 11). It should be appreciated that the communications between the server 30, host system 480 and remote device 70 may be encrypted to render the information in the communications (i.e., telephone numbers, user login identifications, system information and settings, etc.) indecipherable to the public. Although the use of encryption is desirable, the decision of whether encryption is to be used may be left up to the end user or system administrator of the remote device 70, host system 480 and/or server 30. Host system 480 can include a web services connection (i.e., for the Internet) to provide an interface between server 30 and remote device 70. The host system 480 can also include a mobile data server (e.g., server 1174 of FIG. 11) for facilitating data communications between server 30 and remote device 70. A PSTN 54 is also in communication with server 30 and remote device 70.

Figure 5B:
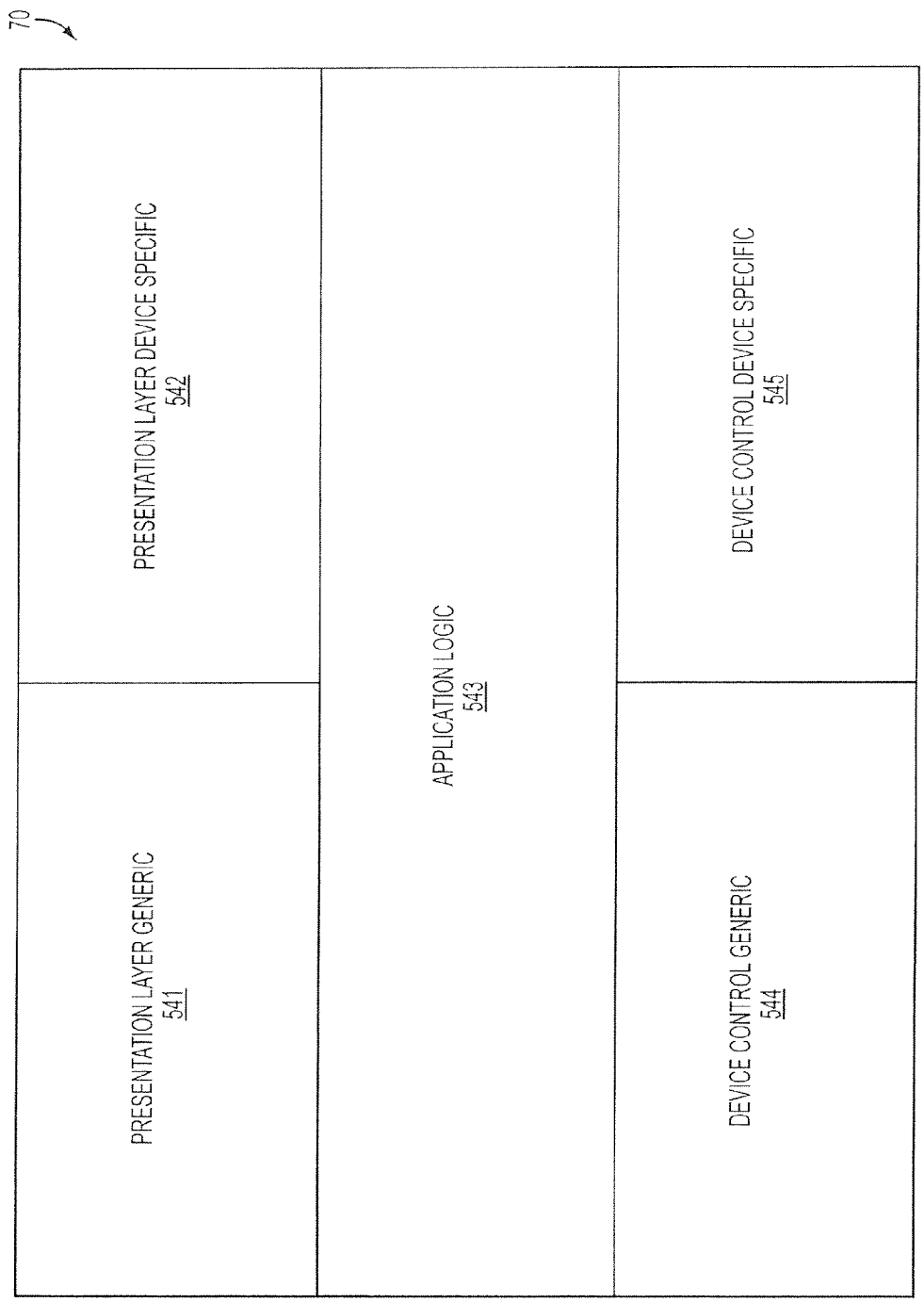
FIG. 5B illustrates example mobile device architecture and applications of the device for use in the FIG. 5A system.

Processor module 250 of server 30 executes one or more programs stored in its associated memory to process calls received through PBX 14 or PSTN 54. Remote device 70 and host system 480 will also contain a "client" application designed to communicate with the server 30 and perform the following processing in accordance with embodiments described herein. FIG. 5B illustrates a sample architecture for remote device 70. The illustrated embodiment includes a generic presentation layer 541, device specific presentation layer 542, application logic 543, generic device control 544 and device specific device control 545. In general, the generic presentation layer 541 controls keypad and display functions.

The device specific presentation layer 542 controls features specific to the device 70. For example, depending on the remote device 70, the features could include interfacing with a track wheel, track ball, or touch screen to name a few.

In the illustrated embodiment, the device 70 typically includes the following. The device 70 will have a screen with reasonable resolution and basic graphical capabilities. The device 70 will also have a basic user input system such as e.g., function keys, reduced or full-size keyboard, and/or a graphical input capability (e.g., touch screen). The device 70 will further include a data communications interface for one or more of GPRS/EGPRS, 1XRTT/EVDO, 802.11A/B/G/N, WiMAX, LTE, UTRAN, and Satellite to name a few. The application running on the device 70 is designed as a generic application that has the capability to utilize the inherent interfaces of the device 70 (e.g., screen, input system and data communications).

The client application utilizes standard API's and built-in capabilities of the e.g., Java ME (J2ME) environment for the management of data presentation (layer 541) and device control (control 544). These standard capabilities allow for a level of generic data presentation, data input control and data messaging such as e.g., TCP/IP, UDP/IP, SMS, USSD, and circuit switched (CS) data to name a few. Data messaging with the above protocols would be supported by the server 30 as well. In addition, each device manufacturer can also provide device specific API's, controls and/or capabilities that allow for greater integration to the device (i.e., device specific presentation layer 542, device specific device control 545). These are typically included as libraries that can be built, linked or packaged with the client application. These device specific controls include, but are not limited to, such features as e.g., thumbwheel control, track ball control, phone book access and controls, security controls and extensions and proprietary or device specific message controls.

The application logic 543 manages the inputs and outputs to and from the device 70 and processes this information in a ubiquitous way to provide the generic device client capabilities such as e.g., administration, inbound call management, outbound call management and mid-call (or call in progress) management. The application logic 543 is written in a way to abstract this logic from the device specific interfaces so all the functionality will work across all the devices supported. As new/future devices become supported, the differences between the client applications is minimized.

Similar to system 10, system 10*a* essentially implements all or part of call management functions typically available on office, enterprise or hotel PBX or other communications network desktop telephone. Some of these features are discussed in detail below. Moreover, as will become apparent from the various call flow processes described in detail below, the server 30 maintains control over inbound, outgoing and in-progress calls and communications. In accordance with example embodiments, FIGS. 6A-6H illustrate the basic call processing flows that the server 30 (via processor module 250), host system 480 and remote device 70 may be programmed to handle and execute.

Figure 6A:
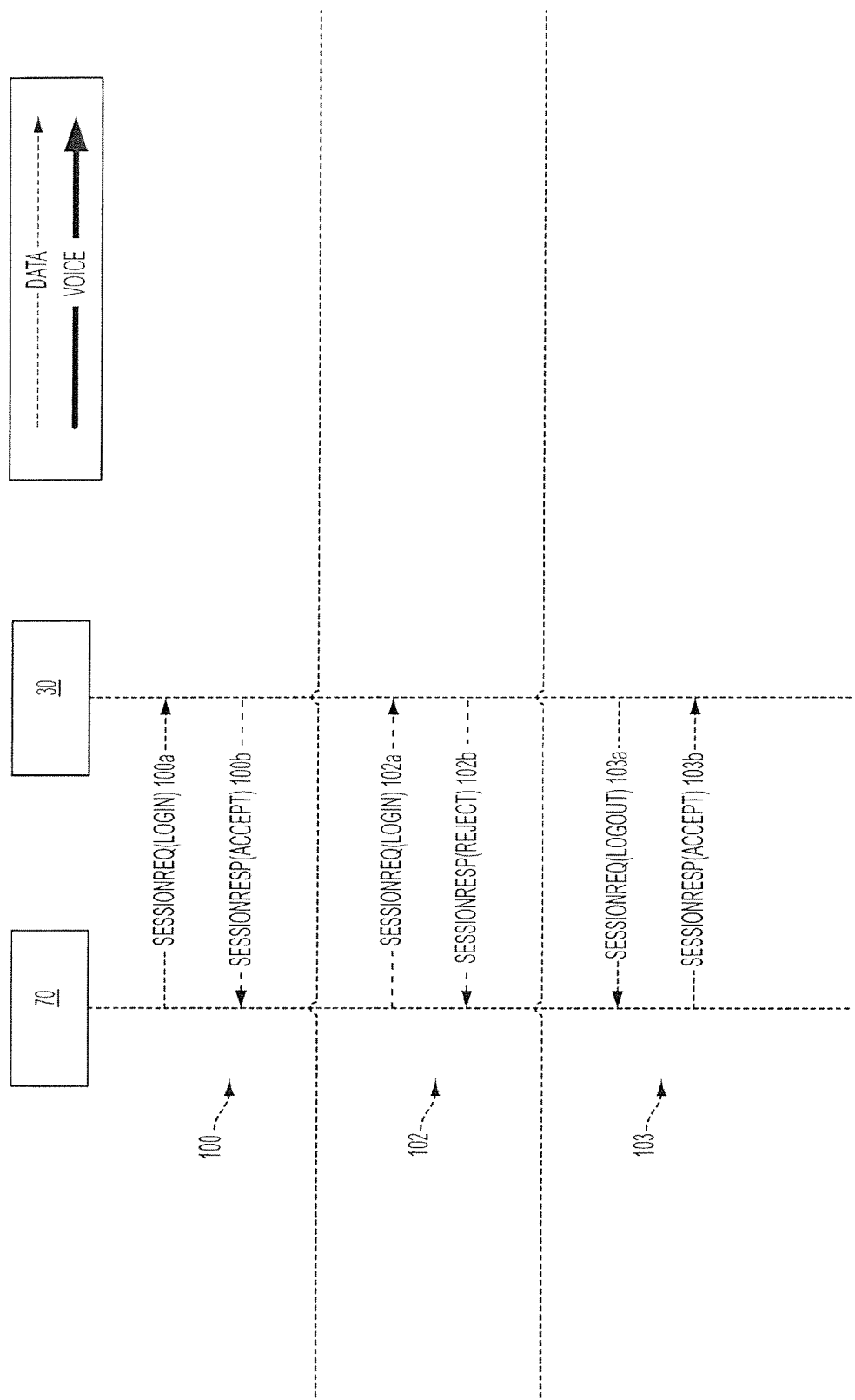

Referring to FIG. 6A, as shown in scenarios 100 and 102, initially a remote device 70 attempts to log into server 30 by sending a session request login data signal to the server 30 (flow lines 100*a*, 102*a*). As is described in more detail below, the message from the remote device 70 is sent through system 480 by any of the various supported methods (e.g., web services). In response, the server 30 will either send a data signal to accept the login request (flow line 100*b*) (i.e., sends a session response accept data signal) or reject the login request (flow line 102*b*) (i.e., sends a session response reject data signal). If the device 70 is accepted by the server 30, the user has access to server 30 and the ability to process calls in any of the methods described below. It should be appreciated that the login request may be performed automatically (e.g., every time the device 70 is powered-up, or periodically), it may happen manually when the user selects a predetermined device application, or it may happen automatically or manually in response to a request from the server 30.

Figure 5C:
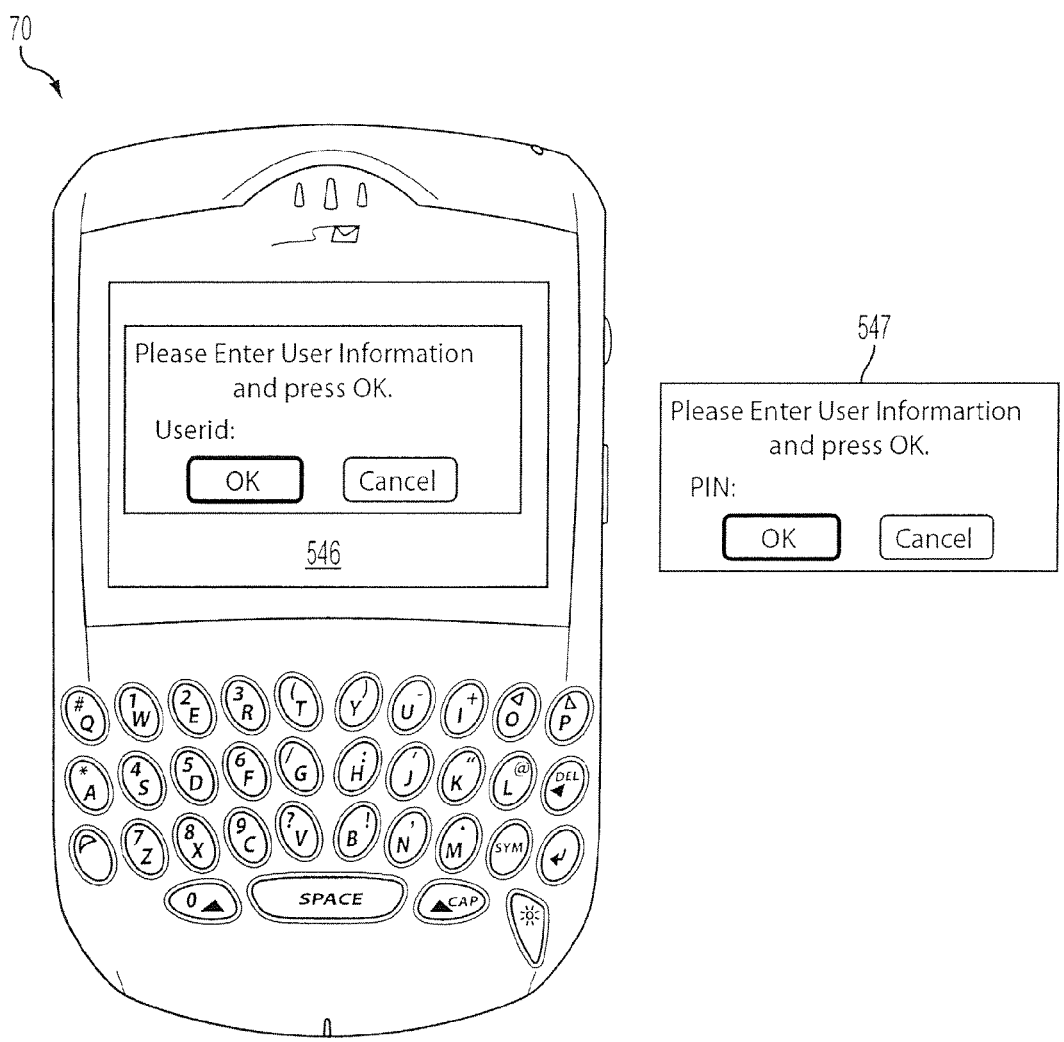
FIGS. 5C-5E illustrate examples of notification and user options displayable on the FIG. 5B device.

FIG. 5C shows an example of a user interface on the remote device 70 allowing the user to perform the login process. As illustrated, the user may be prompted for a user identification (Userid) 546, which could be, but is not limited to IMS Public user ID, NAI per RFC 4282, MSISDN, selection of alphanumeric characters, etc. and then a password or personal identification number (PIN) 547 associated with the Userid. The keypad or track wheel may be used to enter the required information. It should be appreciated that FIG. 5C is just one example of how the user may interface with the remote device to initiate the login process.

At the end of a session or after a predetermined time period, as shown in scenario 103, the server 30 sends a session request logout data signal to the remote device 70 (flow line 103a). The remote device 70 responds with a session response accept data signal accepting the logout request from the server 30 (flow line 103b). It should be noted that the server 30 is initially programmed to require the remote device 70 to login about every 24 hours. The user (via device 70 and as shown below) or a server administrator (via server 30) can change this timing, as well as other system features and settings. The additional logins serve as an easy means for re-authenticating the user and the user's device, and may be optional. This timer value may be sent back in the session response accept data signal. On expiry of no update is received from the remote device 70 the registration shall be deleted. The remote device shall store the timer in memory.

Other information may also be sent back in the session response accept data signal such as the need to perform a heart beat signal, the periodicity of said signal, and other configuration information. Such information is stored in the remote device 70. In another implementation a URL could be sent back indicating the location of where configuration data is stored and where the remote device can retrieve said information from.

Figure 6B:
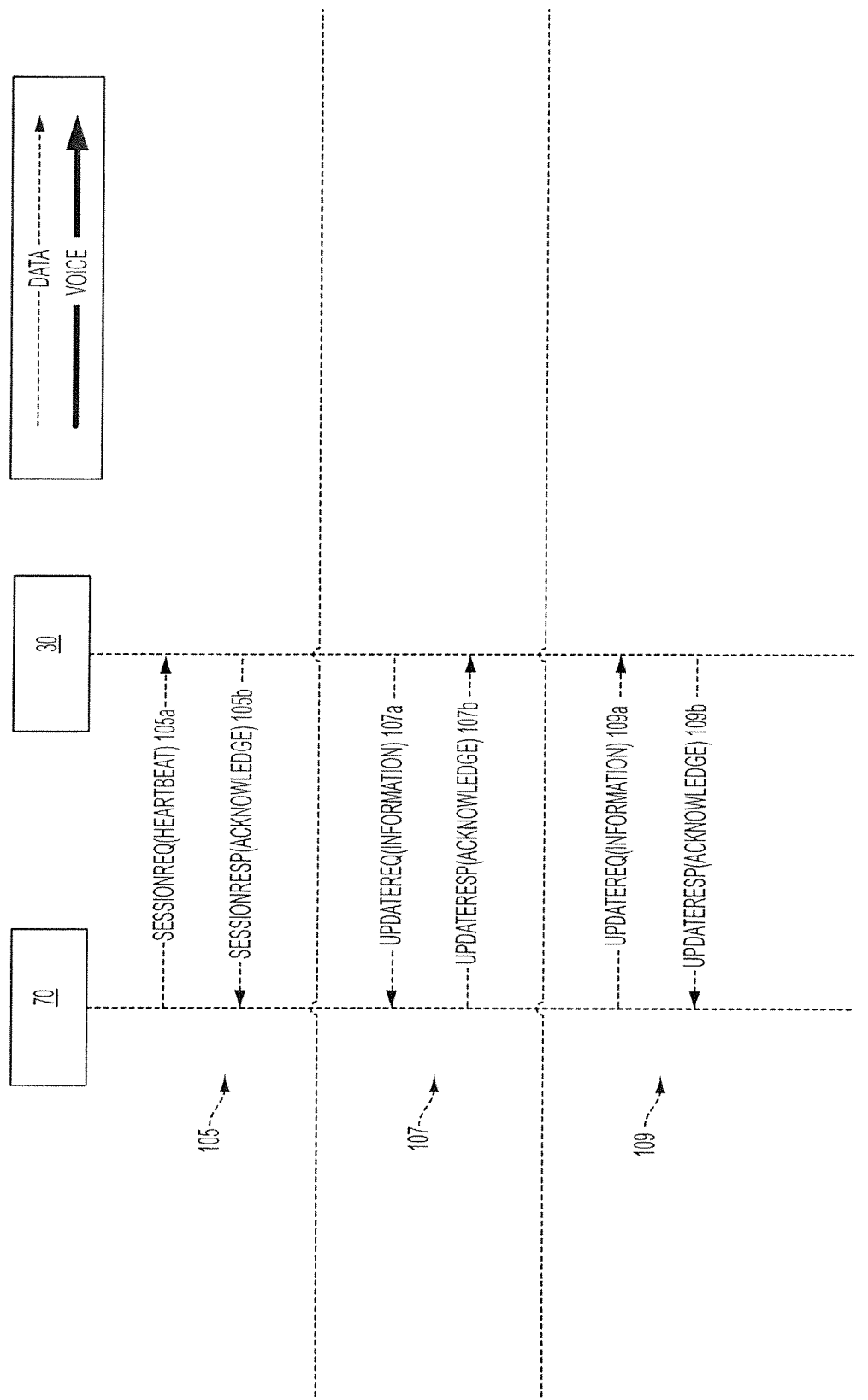

Remote device 70 and server 30 can periodically or continuously request information from each other using data signals as shown in FIG. 6B. In scenario 105, remote device 70 provides a session request heartbeat data signal to server 30 (flow line 105a) periodically or continuously (as set by default, user setting or system setting), which is acknowledged by server 30 in a session response acknowledge data signal (flow line 105b).

In scenario 107, the server 30 sends an informational update request data signal to remote device 70 (flow line 107a), which is acknowledged by the device 70 in an update response acknowledge data signal (flow line 107b). Update signals from server 30 can include e.g., profile information, system settings, messages, etc.

In scenario 109, the remote device 70 sends an informational update request data signal to server 30 (flow line 109a) that is acknowledged by the server 30 in an update response acknowledge data signal (flow line 109b). Update signals from the remote device 70 can include profile information, Do Not Disturb information (DND), user preferences, device configuration settings, call forwarding information such as SIP/TEL URI, E.164 number, extension, requests for translating a PNP address to another address or coded as an E.164 address (said E.164 address or PNP address may be an address with the property that when used in a communication, the communication costs incurred by the user are less than when the not transformed number was used). It should be appreciated that this application also covers the use of E.212 numbers (IMSI), but for convenience purposes only refers to E.164. A remote may decide to request translation because of the availability of the PNP, presence of a public network, or based on location indicators, etc.

Figure 5D:
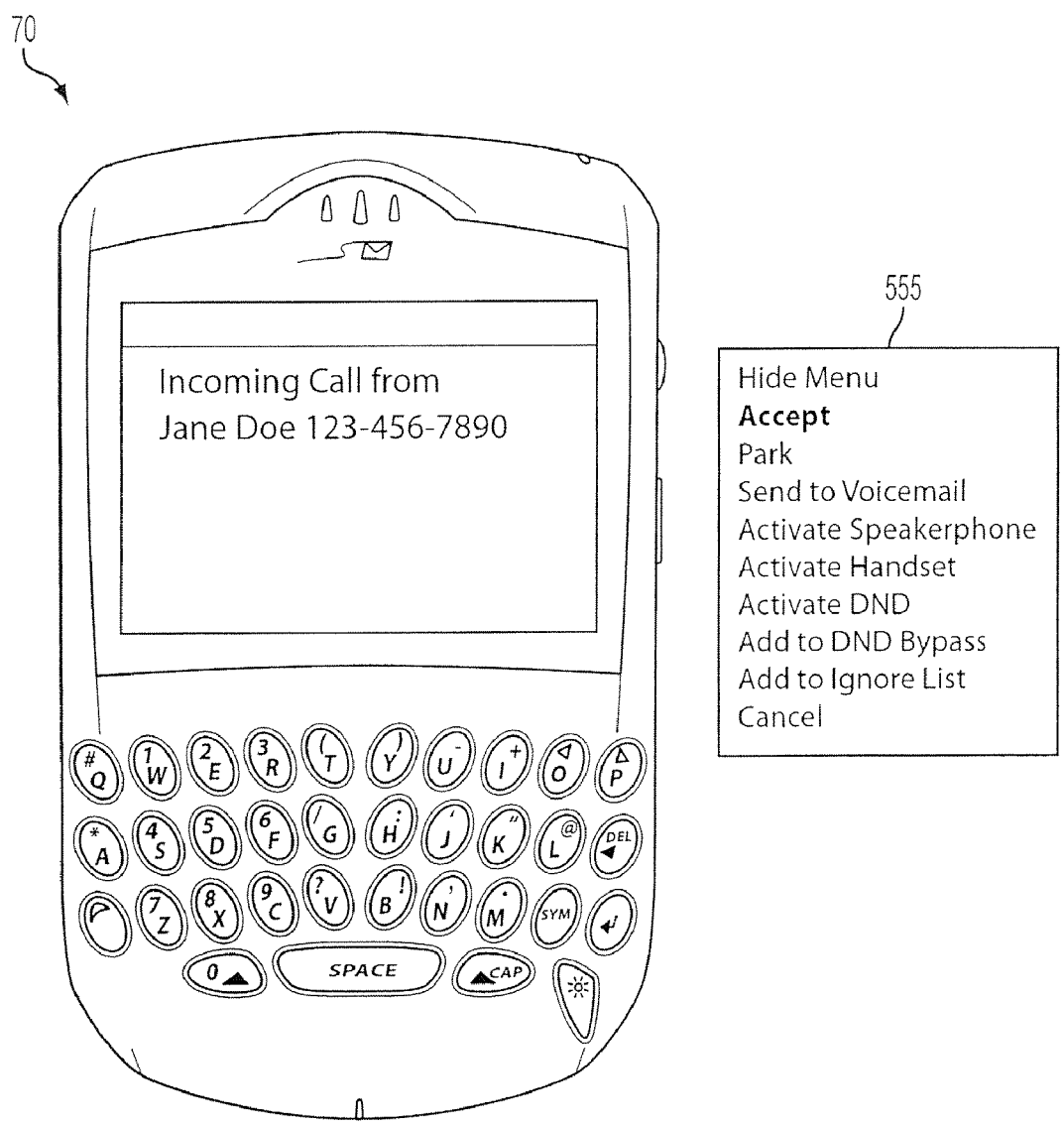
Figure 6C:
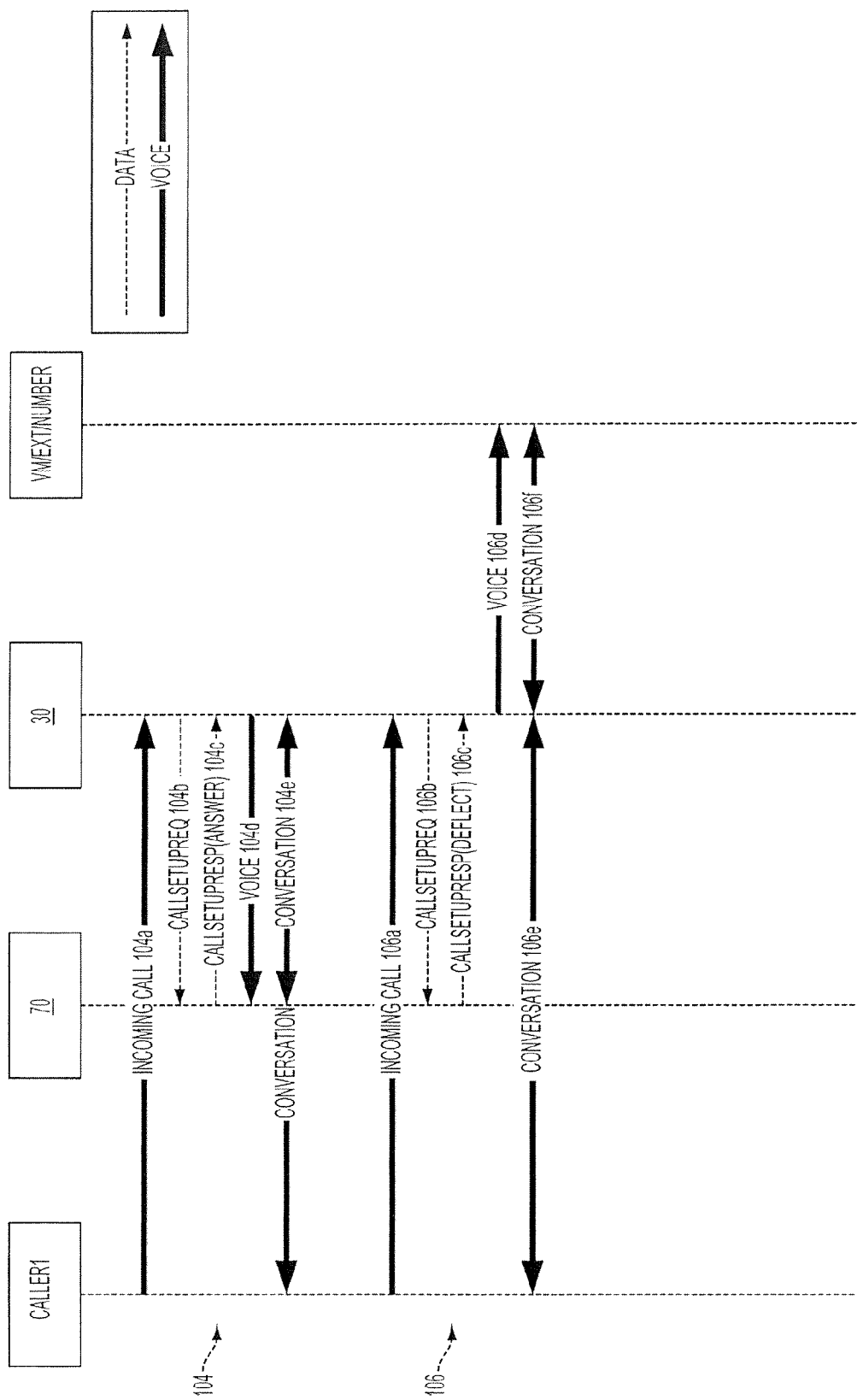

In scenario 104, as shown in FIG. 6C, a user can accept an incoming call placed to a PBX extension or DID telephone number by a caller (e.g., caller1). The user's PBX extension or DID telephone number may be considered a primary telephone number. The user's primary telephone number could also be a primary wireless telephone number if the user desired. In the illustrated embodiment, the user's PBX extension or the DID telephone number may be the primary telephone number. Server 30 receives an incoming voice call from the calling party (flow line 104a). Server 30 sends a call setup request data signal to the remote device 70 (flow line 104b) inquiring whether or not the user would like to accept the call. The call setup request data signal will cause an audible, visual and/or vibrational indication to occur on the remote device 70 (as set by a user or system preference). System preferences could be provisioned by said techniques above or by OMA Device Management using an available data path (service) such as GPRS or via the circuit switched services SMS or USSD. Such preferences are stored in memory in the remote device, said memory could be internal or could be a removal memory media such as but not limited to Compact Flash, MicroSD, Memory Stick etc. For example, the call setup request data signal may cause the remote device 70 to play a ring, ring tone or other suitable audible indication. The call setup request data signal may cause the device 70 to display a textual or graphical message, pop-up or other visual notification (e.g., blinking LED on the device 70). FIG. 5D illustrates a textual message "Incoming Call from Jane Doe 123-456-7890" to alert the user of the caller. User responses may include, e.g., "answer" or "deflect". FIG. 5D illustrates options 555, which the user may select at this point. In scenario 104, the user chooses to answer the call by having the device 70 send a call setup response answer data signal to the server 30 (flow line 104c). This may be performed by selecting "accept" from the options 555 illustrated in FIG. 5D. In response, the server 30 will setup a voice call to the remote device (voice signal flow line 104d) and substantially seamlessly connect the held calling party's incoming call to the remote device 70 via PSTN connection 54 (shown as voice signal flow line 104e). The user's acceptance or denial can be a manual input operation or automatic operation based on programmed user interfaces.

In scenario 106, the user of the remote device 70 wishes to deflect the inbound call to voicemail (voicemail address translation may have to occur as described above). In this scenario, server 30 receives an incoming voice call from the calling party (flow line 106a). Server 30 sends a call setup request data signal to the remote device 70 (flow line 106b) inquiring whether or not the user would like to accept the call. One or more of the above mentioned visual, audible and/or vibrational indications will be present at the remote device 70. The user chooses to deflect the call by having the device 70 send a call setup response deflect data signal to the server 30 (flow line 106c). This may be performed by selecting "send to voicemail" from the options 555 illustrated in FIG. 5D. In response, the server 30 will setup a voice call to e.g., the voicemail box associated with the user's PBX extension or other voicemail box setup by the user (voice signal flow line 106d). The server 30 connects the held calling party's incoming call to the voicemail box via PSTN connection 54 (shown as voice signal flow lines 106e and 106f). The calling party communicates via PSTN connection 54 with the user's voicemail via a connection path between the calling party and server 30 (flow line 106e), and another connection path between server 30 and the voicemail (flow line 106f).

Figure 5E:
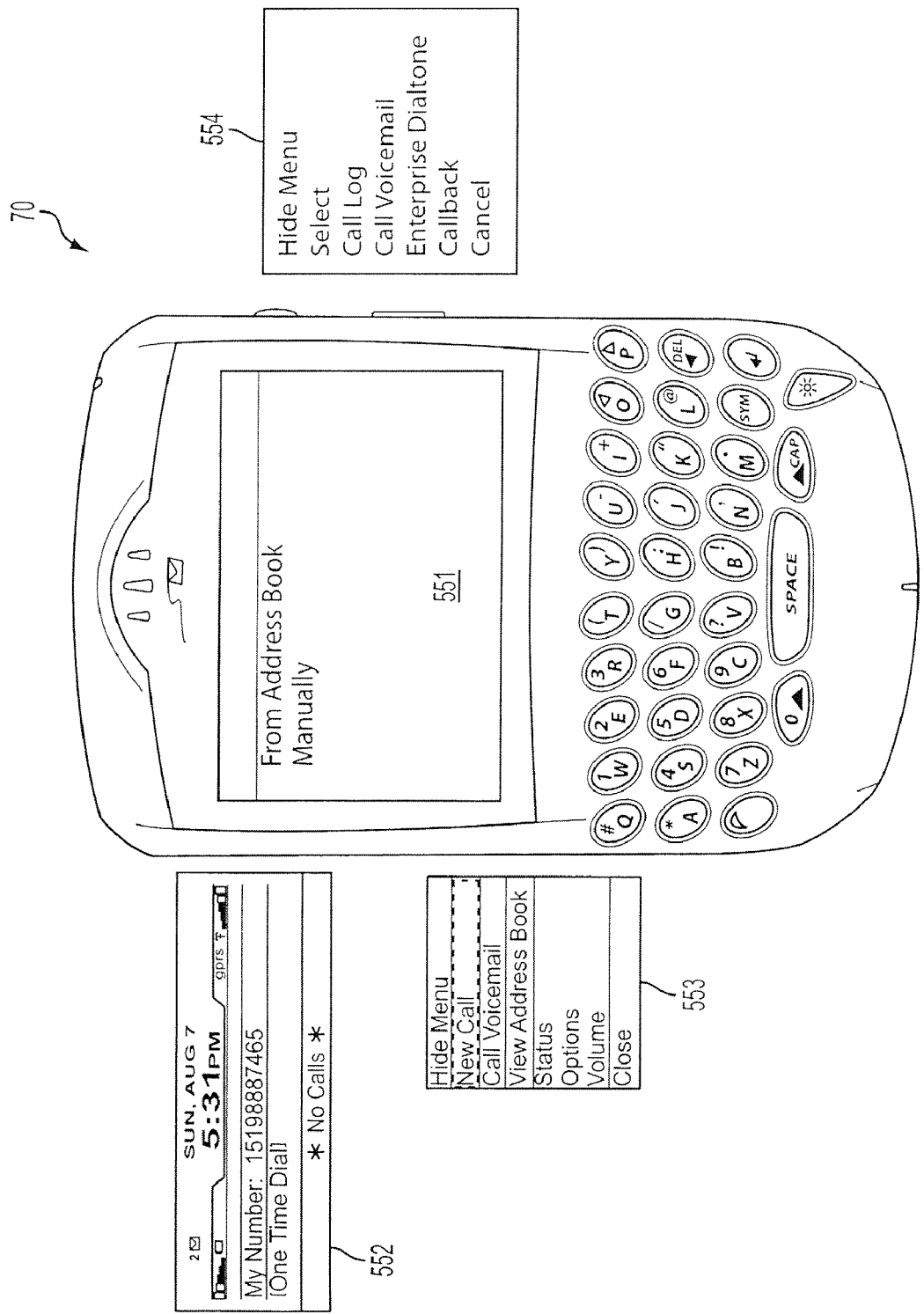

In FIG. 6D, scenarios 108 and 110 illustrate outgoing (from the remote device 70 through the server 30 and thus, the PBX) call scenarios. If a user wants to place a call to party 1, the user has the remote device 70 send an out dial request data signal (flow lines 108a and 110a) to server 30 requesting to place an outbound call through the server 30 (party 1's address may have to be translated as described above). FIG. 5E illustrates several user interfaces for the remote device 70 to accomplish this. For example, there may be options 551 for selecting the outbound number from an address book or entering the number manually. Menu option 553 illustrates a listing of call placement options as well. Option 552 shows a field for manual entry of the number to be dialed. Option 554 illustrates another menu or pop-up that contains selections for the user to initiate the outbound call. It should be noted that any input mechanism (e.g., keyboard, track wheel, stylus, touch, voice recognition, etc.) may be used to select the desired option.

Server 30 determines from the request whether the user and/or remote device 70 has sufficient rights to place the outbound call. Server 30 will respond by sending an out dial response accept data signal accepting the user's request (flow line 108b), or by sending an out dial response reject data signal (flow line 110b) rejecting the outbound call to remote device 70 depending on the user's rights. If the server 30 rejects the request (scenario 10), the out dial response reject data signal (flow line 110b) may include the reason for the rejection.

If server 30 accepts the outbound call request (scenario 108), the server 30 will place an outbound voice call (flow line 108c) to the remote device 70 and another voice call (flow line 108d) to the called party (e.g., party 1). The server 30 then essentially seamlessly connects the two calls allowing voice communications (two-way voice communication signal flow line 108e) between the called party and user of the remote device 70.

As can be seen, both inbound and outbound call processing do not utilize voice communications between the remote device 70 and server 30 until it is determined that the user of the device 70 wishes to receive the call (inbound) or has access rights to place the call (outbound). This saves costs by not using the PSTN connections until absolutely necessary. Moreover, the use of data signals provides the remote device 70 with additional information and control over the call, which is not done in today's devices.

Figure 6E:
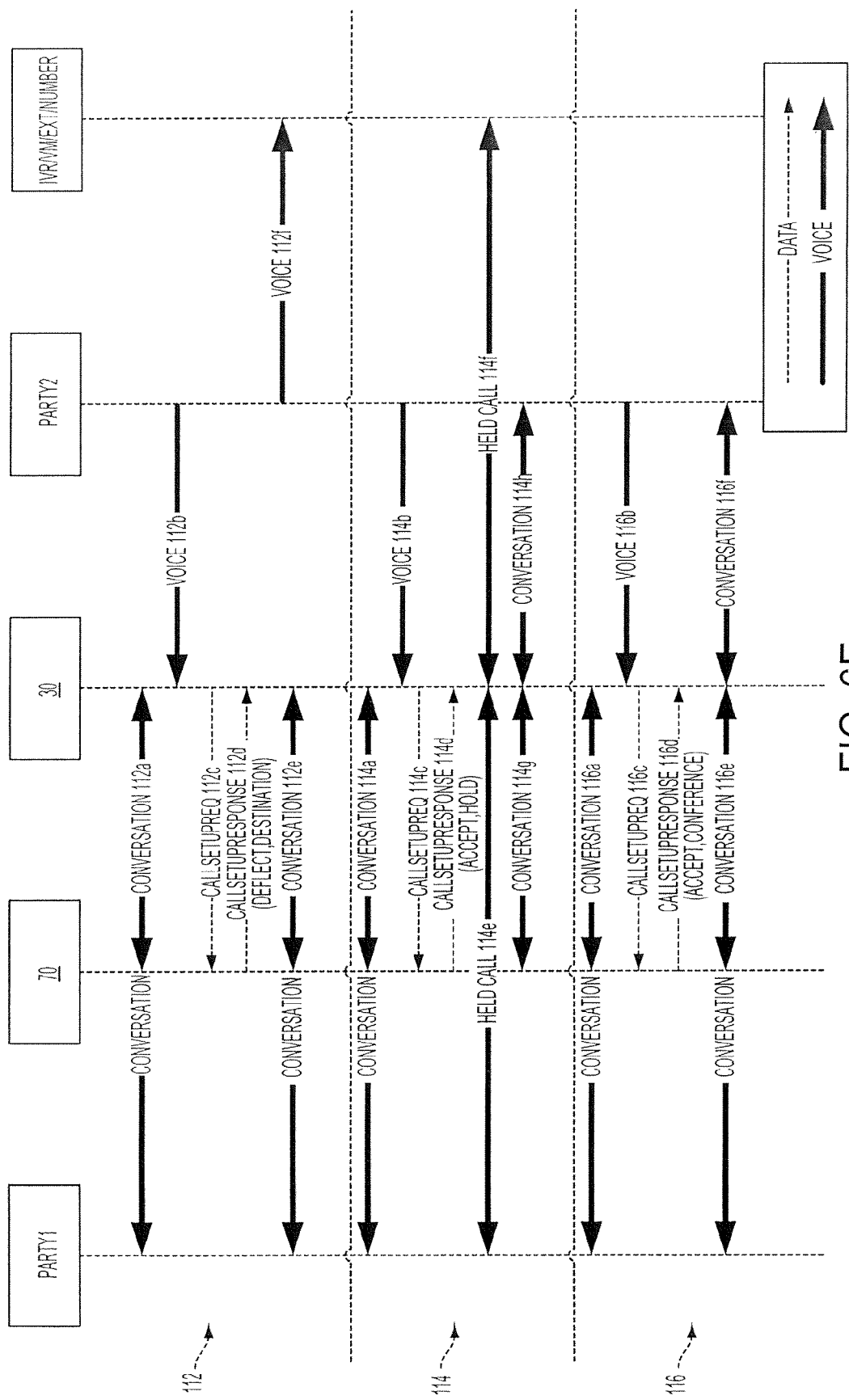

Scenarios 112-130, as illustrated in FIGS. 6E-6H, relate to call processing while a call/connection is already in progress. Referring to FIG. 6E, in scenario 112, during a voice communication between remote device 70 and party 1 through server 30 (communication flow line 112a), server 30 receives a second voice call communication (flow line 112b) from party 2 destined for the user of remote device 70. Server 30 sends a call setup request data signal (flow line 112c) to the remote device 70 alerting the device 70 to the new call. This may be in an in band message such as tones or an out of band message over another data channel such as but not limited to IP, SMS, USSD, etc. The call setup request data signal will cause an audible, visual and/or vibrational indication to occur on the remote device 70 (as set by a user or system preference and as described above in more detail). In scenario 112, the remote device 70 user has chosen to deflect the second call by sending, to server 30, a call setup response data signal (flow line 112d) deflecting the call to a destination contained in the data signal. This may be performed by selecting e.g., "send to voicemail" from the options 555 illustrated in FIG. 5D. The established voice communications between the remote device 70 and party 1 remain (communication flow line 112e), but the server deflects the second call to the identified destination (shown in FIG. 6E as e.g., a IVR, voicemail, extension or other number) via another voice communication (flow line 112f).

In scenario 114, during a voice communication between remote device 70 and party 1 through server 30 (communication flow line 114a), server 30 receives a second voice call communication (flow line 114b) from party 2 destined for the user of remote device 70. Server 30 sends a call setup request data signal (flow line 114c) to the remote device 70 alerting the device 70 to the new call. One or more of the above mentioned visual, audible and/or vibrational indications will be present at the remote device 70. In this scenario, the user has chosen to accept the second call by sending a call setup response accept and hold data signal (flow line 114d) to the server 30. This may be performed by selecting "accept" from the options 555 illustrated in FIG. 5D. The server 30 will place the first voice call on hold (flow line 114e) and/or deflect the first call to the user's voicemail or destination (flow line 114f). Server 30 will establish and connect a voice communication (flow line 114g) with the remote device 70 and a voice communication (flow line 114h) with party 2.

In scenario 116, communication flow lines 116a-116c are similar to communication flow lines 114a-114c described above. In scenario 116, however, the user has decided to accept and conference in the second call by sending a call setup response accept and conference data signal (flow line 116d) to the server 30. This may be performed by selecting an option presented on the device 70 or by pressing a key or combination of keys on the device 70. The server 30 maintains the voice communication (flow line 116e) of the in progress call and connects it to a voice communication (flow line 116f) between the second calling party (party 2) and server 30, which connects party 1, party 2 and the user of the remote device 70.

Figure 6F:
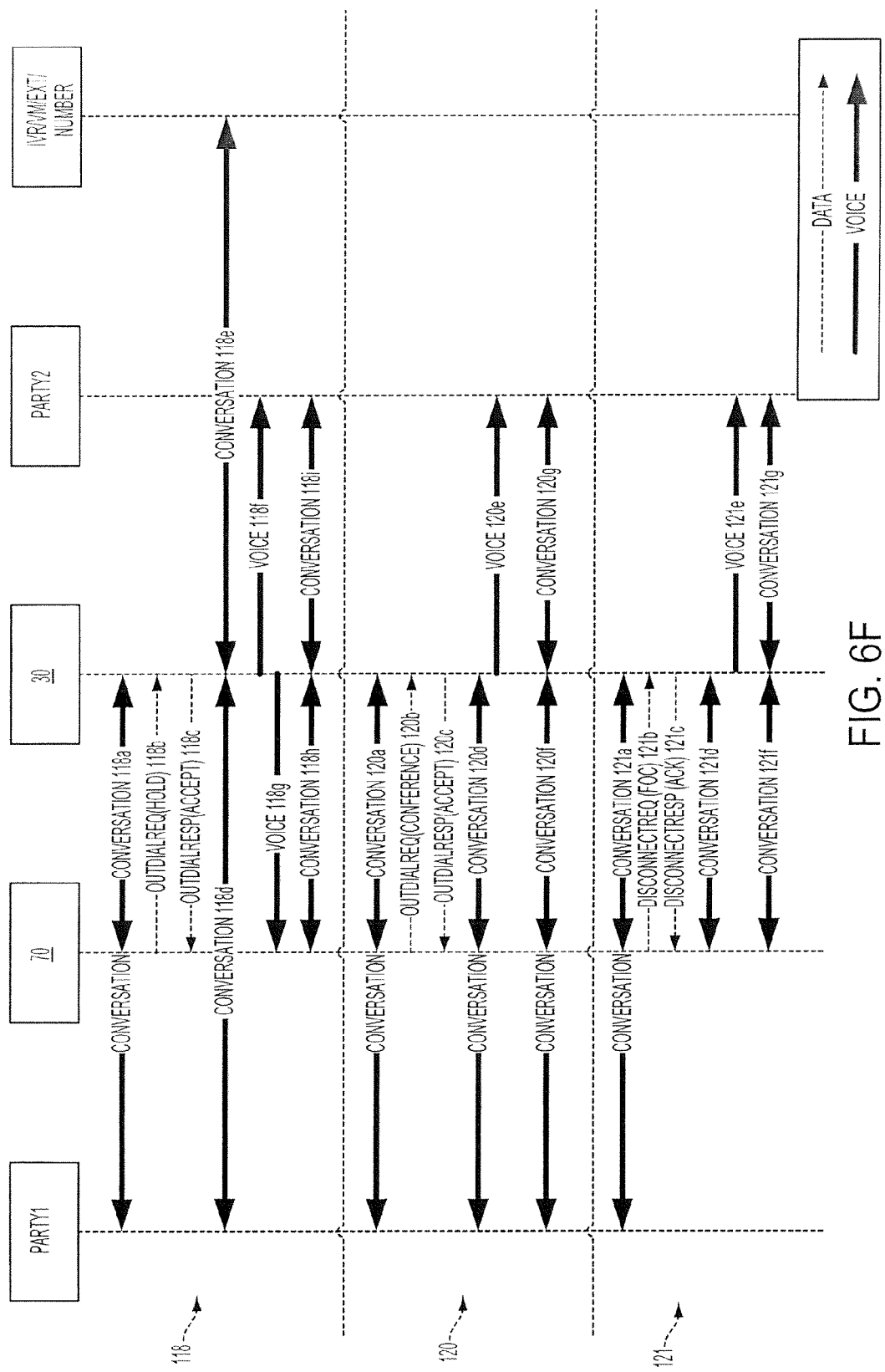

According to other embodiments disclosed herein, during other "call in progress" scenarios, a user of the remote device 70 can place outbound calls as shown in scenarios 118 and 120 (illustrated in FIG. 6F). In both scenarios, party 1 and a user of remote device 70 have a voice call in progress (flow lines 118a and 120a) via server 30. In scenario 118, the user of remote device 70 begins to place a second call by sending an out dial request hold data signal (flow line 118b) to server 30. This may be performed by selecting an option presented on the device 70 or by pressing a key or combination of keys on the device 70. Server 30 will respond using an out dial response accept data signal (flow line 118c). The server 30 places the first call on hold (voice communication flow line 118d) and/or deflects the first call to the user's voicemail or other destination (voice communication flow line 118e). Server 30 will then place a second voice call/communication (flow line 118f) to party 2 and a third voice call/communication (flow line 118g) to remote device 70. Server 30 then seamlessly connects remote device 70 to the second called party (communication flow lines 118h and 118i).

In scenario 120, the user of remote device 70 desires to place a second call and conference in party 2. To do so, the user of remote device 70 sends an out dial request conference data signal (flow line 120b) to server 30. This may be performed by selecting an option presented on the device 70 or by pressing a key or combination of keys on the device 70.

Server 30 responds using an out dial response request data signal (flow line 120*c*). Server 30 then places a second voice call/communication (flow line 120*e*) to party 2, while maintaining the initial voice call connection (flow line 120*d*). Server 30 will seamlessly connect the initial voice communication to the second voice communication (see communications flow lines 120*f* and 120*g*). It should be appreciated that scenarios 118, 120 and 121 are preferably implemented using dual-mode remote devices 70 or a dual-mode interface in order to properly handle voice and data communications during the same scenarios.

Additionally, as shown in scenario 121, during a voice communication 121*a* already in progress, remote device 70 can send a disconnect request and follow on call (FOC) data signal (flow line 121*b*) to server 30 requesting to disconnect the current voice communication and place a follow on call. This may be performed by selecting an option presented on the device 70 or by pressing a key or combination of keys on the device 70. The server 30 acknowledges this request with a disconnect response data signal (flow line 121*c*). Server 30 will disconnect party 1, maintain a voice communication (flow line 121*d*) with the remote device 70, and place an outgoing voice communication call (flow line 121*e*) to party 2. Server 30 then will connect the two voice communications to form voice conversation between the remote device 70 and party 2 (via communication flow lines 121*f* and 121*g*).

Figure 6G:
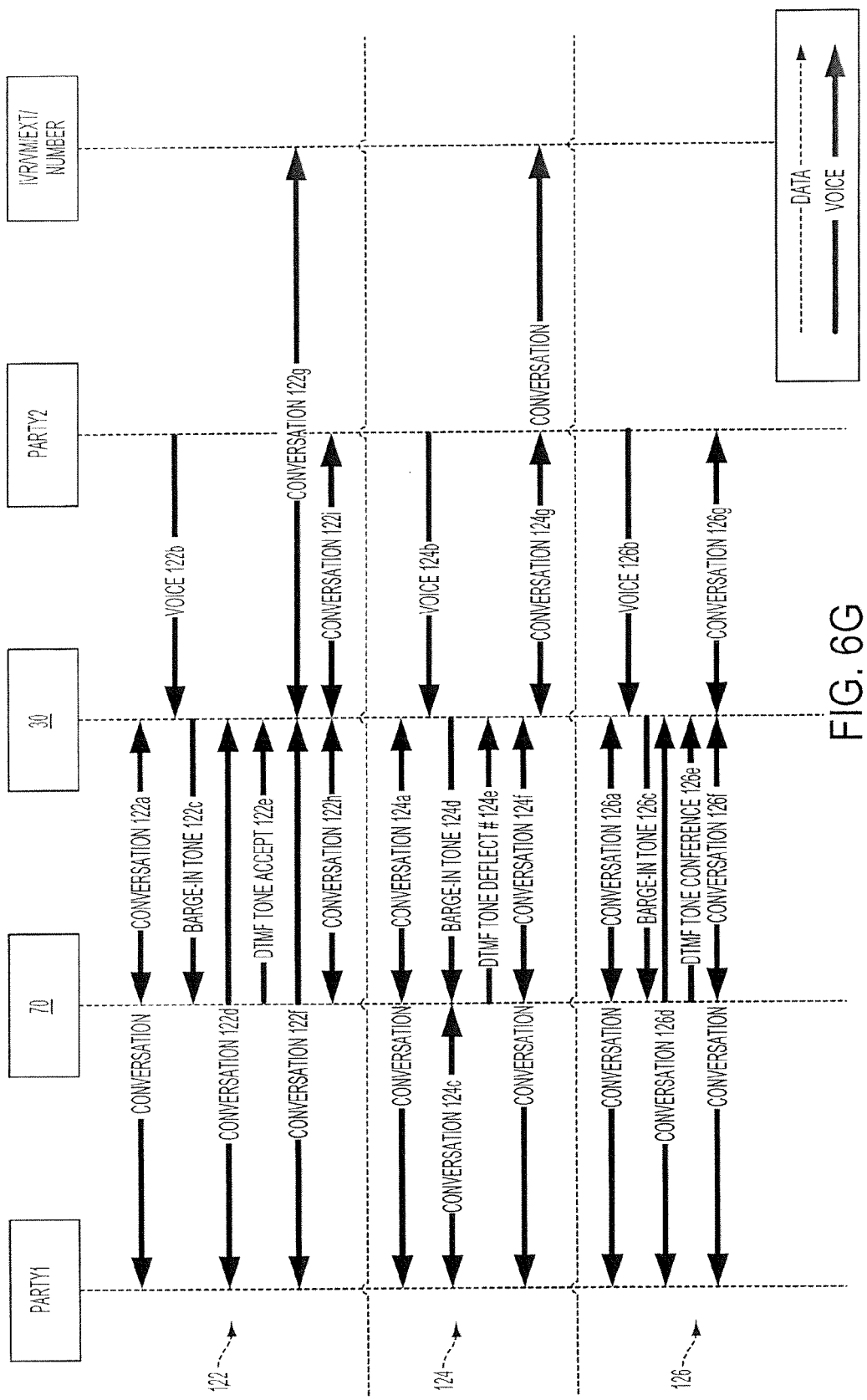

During similar call-in progress scenarios, a user can receive inbound calls and place outbound calls using DTMF coding via the PSTN connection as shown in scenarios 122-130 illustrated in FIGS. 6G and 6H. Each scenario respectively begins with a voice communication flow 122*a*, 124*a*, 126*a*, 128*a*, 130*a* (via server 30) between party 1 and a user of remote device 70.

Referring to FIG. 6G, in scenario 122, a second voice communication (flow line 122*b*) is received by server 30. Server 30 sends a barge-in tone signal (flow line 122*c*) via DTMF coding to remote device 70 while the original voice conversation (flow line 122*d*) continues. In a desired embodiment, the server 30 filters the signal in a manner such that only the recipient of the remote device 70 hears the tone. This way, party 1 (or party 2) does not hear the tone. The user of the remote device 70 responds using an accept DTMF tone signal (flow line 122*e*). This may be performed by selecting an option presented on the device 70 or by pressing a key or combination of keys on the device 70. Again, in a desired embodiment, this signal is also filtered by the server 30 to ensure that party 1 (or party 2) does not hear the tone. The original conversation is placed on hold (communication flow line 122*f*) and/or deflected to e.g., voicemail (communication flow line 122*g*). Server 30 will seamlessly connect remote device 70 to party 2 (voice communication flow lines 122*h* and 122*i*).

The user of the remote device 70 can, alternatively, deflect the second call to his/her voicemail or another number associated to the user's extension, as shown in scenario 124. Communication flow lines 124*a*-124*d* are similar to communication flow lines 122*a*-122*d* described above. In this scenario, the user of the remote device 70 responds using a deflect DTMF tone signal (flow line 124*e*) (e.g., by selecting an option on the device 70, or by pressing a predefined key or key combination) to deflect the second call to his/her voicemail, etc. (voice communication flow line 124*g*) while the original conversation (communication flow line 124*f*) continues.

In scenario 126, the remote device 70 user decides to conference-in party 2. Communication flow lines 126*a*-126*d* are similar to communication flow lines 122*a*-122*d* described above. In this scenario, however, the user of the remote device 70 responds using a conference DTMF tone signal (flow line 126*e*) (e.g., by selecting an option on the device 70, or by pressing a predefined key or key combination) to alert the server that party 2 should be conferenced-in. Server 30 will then seamlessly connect the initial conversation (voice communication flow line 126*f*) and party 2 (voice communication flow line 126*g*).

Referring to FIG. 6H, in scenario 128, during an ongoing voice communication (flow line 128*a*), the user of the remote device 70 decides to send a hold DTMF tone signal (flow line 128*b*) to server 30 requesting the server 30 to place the current call on hold and to place an outbound call. This may be performed by any of the mechanisms described above. In response, server 30 will place the original communication (flow line 128*c*) on hold and/or deflect the original call to another number e.g., user's voicemail (communication flow line 128*d*), and place an outbound voice communication (flow line 128*e*) to party 2. Server 30 also forms a voice connection (flow line 128*f*) to the remote device 70, and then seamlessly connects party 2 to the remote device 70 (communication flow lines 128*g* and 128*h*).

In scenario 130, the user of the remote device 70 can conference (i.e., add a third party) to an existing voice communication (flow line 130*a*). To do so, the user of the remote device 70 sends a conference DTMF tone signal (flow line 130*b*) to server 30 while the existing communication (flow line 130*c*) continues. This may be performed by any of the mechanisms described above. Server 30 then places a second voice call (flow line 130*d*) to party 2 and seamlessly connects this call to the existing conversation (communication flow lines 130*e* and 130*f*) creating a conference.

One more call in progress scenario allows the user to disconnect the current call and place a follow on call as shown in scenario 131. That is, with a voice communication in progress (flow line 131*a*), the remote device 70 sends a disconnect, follow on call DTMF tone signal (flow line 131*b*) to the server 30. This may be performed by any of the mechanisms described above. Server 30 allows remote device 70 to maintain a voice communication connection (flow line 131*c*) with the server 30 and then places an outgoing voice communication (flow line 131*d*) to party 2. Server 30 will then connect remote device 70 to party 2 (communication flow lines 131*e* and 131*f*).

It should be appreciated that the interaction between remote device 70 and server 30 can include any call processing telephony functions such as simultaneous ring across multiple devices, single voicemail box, universal voice mail notification, answer acknowledgement, making and receiving a call, abbreviating extension dialing, call hold and retrieval, multiple call appearance, direct inward/outward dialing, post digit dialing, flexible dialing plans/international dialing, caller ID (name, number), voicemail notification, auto reconnect, callback, call forwarding, call transfer, call hold, call waiting, call mute, call blocking, call redial, call parking, speed dial, operator assisted dialing, Do Not Disturb (DND), DND Bypass List (i.e., a list of names/numbers allowed to bypass the do not disturb feature), and DND Ignore List (i.e., a list of names/numbers to always divert to voicemail).

Figure 7:
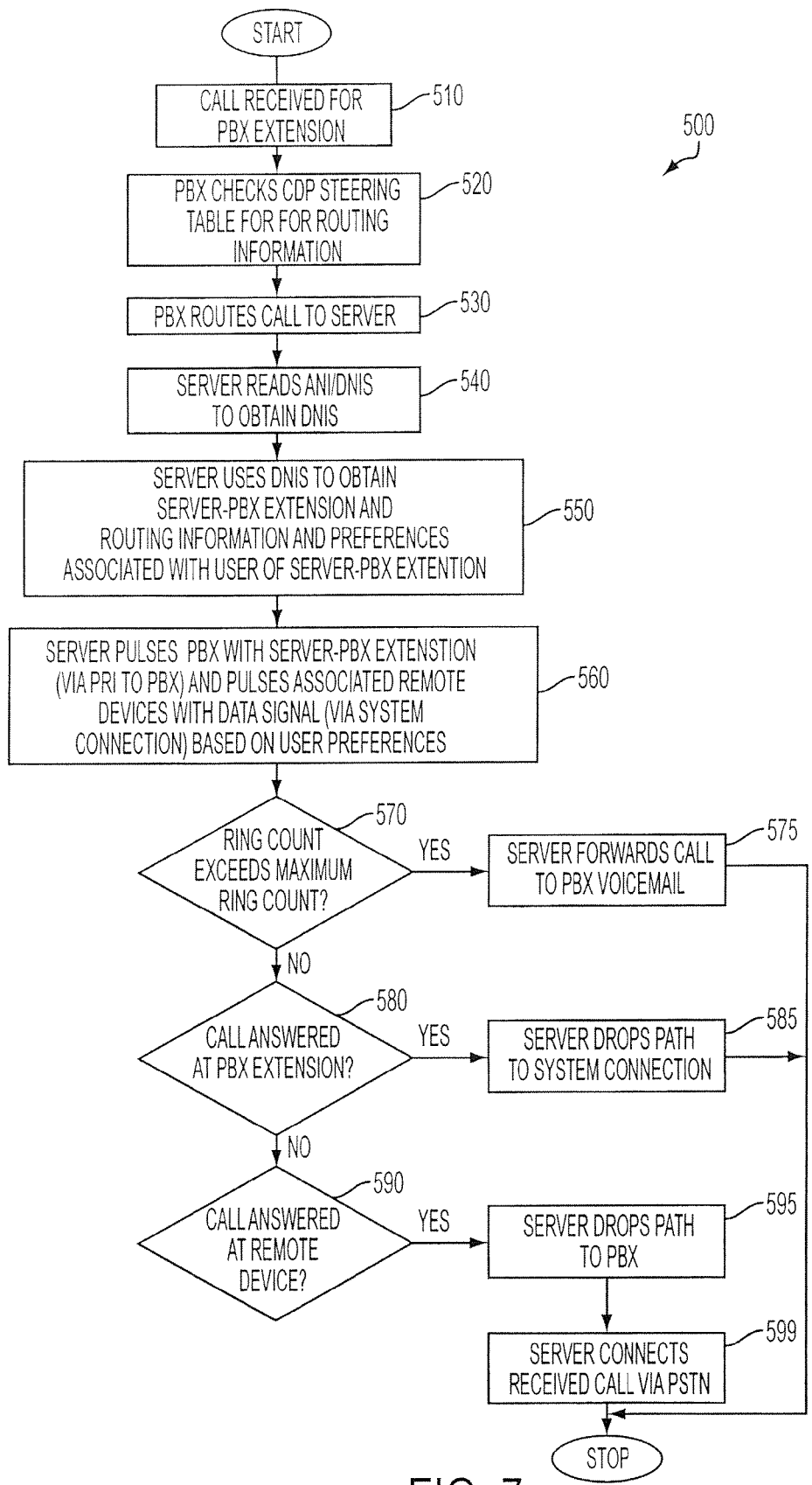
FIG. 7 illustrates in flowchart form exemplary inbound station-to-station call processing performed in accordance with an embodiment disclosed herein.

In accordance with another embodiment, system 10*a* can be implemented using other call processing formats. As illustrated in FIG. 7, when an incoming station-to-station call (i.e., a direct extension call from one internal telephone device to another internal device) is received by the PBX 14 for an existing PBX extension (step 510), the PBX 14 looks up the PBX extension in the CDP steering table (step 520) to determine where the call should be routed. Based on information in the CDP steering table, the call to the PBX extension is routed to the server 30 instead of being directly routed to an office telephone 12*a* (step 530).

As is known in the art, the incoming call will have automatic number identification (ANI) and dialed number identification service (DNIS) information. The ANI identifies the telephone number of the calling party and is traditionally used for "caller ID." DNIS identifies the telephone number of the called party. The server 30 reads the ANI/DNIS information from the incoming call to obtain the DNIS information (step 540). As noted above, the server 30 has assigned a new SERVER-PBX extension to each existing PBX extension. The SERVER-PBX extension and user preferences are obtained from database 270 through processor 250 by using the DNIS information as an index into the server 30 database 270 (step 550). Routing information will include caller information, any additional remote telephone numbers or voicemail box numbers, or other identification numbers of communication devices associated with the PBX extension. Examples of user preferences are given below.

At step 560, the server 30 holds the incoming communication and pulses the PBX 14 through the PRI connection 22 between the server 30 and PBX 14 with the SERVER-PBX extension obtained in step 550. This causes the PBX 14 to ring the associated office telephone (e.g., telephone 12*a*). At the same time (if the user preferences indicate the desire), the server 30 attempts to contact one or more alternative remote communication devices (e.g., by initially sending a data signal to the remote device 70). In such an embodiment, the station-to-station call is thus routed to both the office telephone and also to at least one remote device 70 simultaneously or substantially simultaneously (or as determined by the user preferences).

Figure 7A:
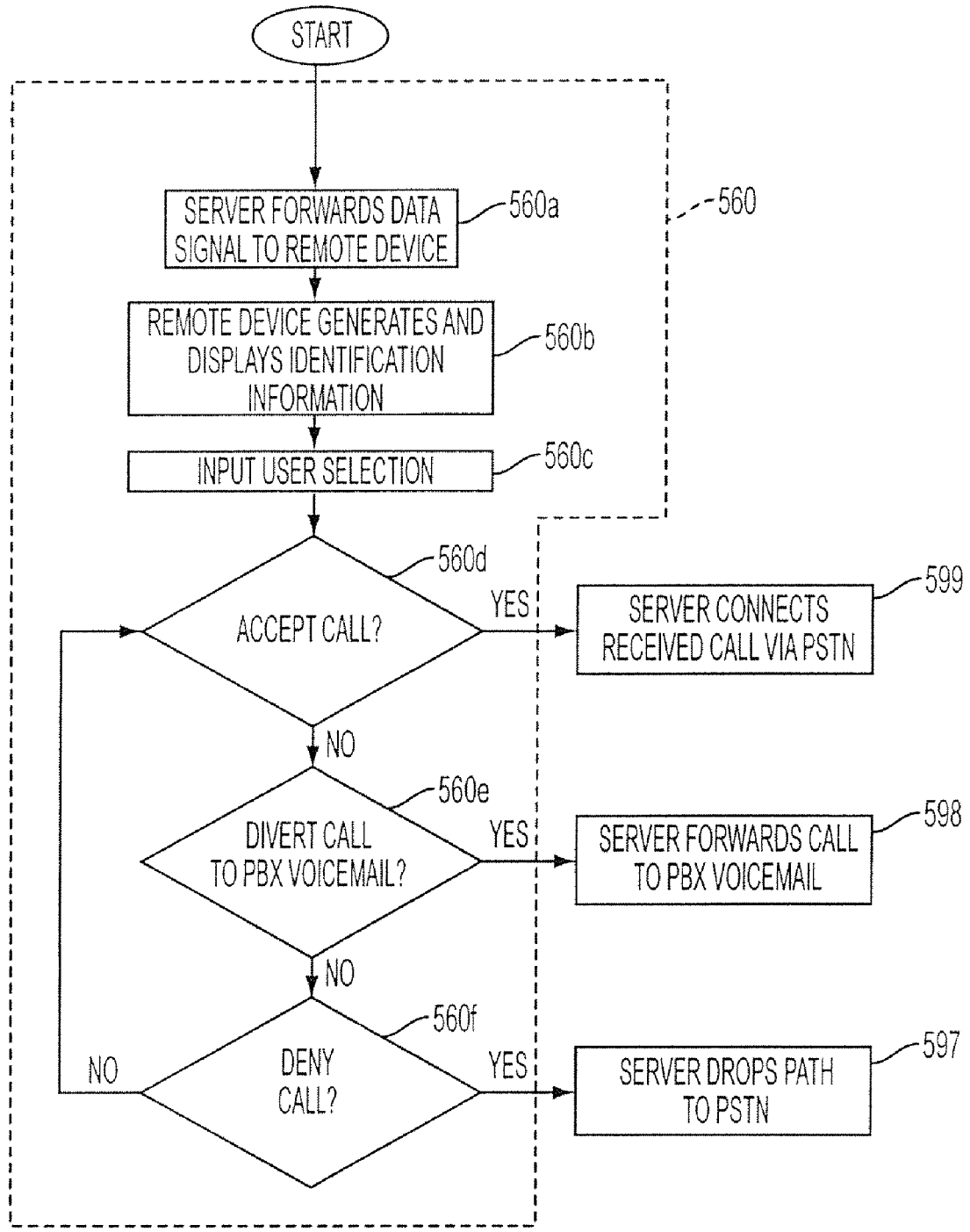
FIG. 7A further illustrates in flowchart form inbound station-to-station call processing performed in accordance with an embodiment disclosed herein.

As shown in FIG. 7A, step 560 comprises multiple steps. When server 30 attempts to contact remote device 70 via system 480, the server 30 will forward a data signal (e.g., a call setup request) through system 480 to the remote device 70 (step 560*a*). The data signal carries the DNIS information to the remote device 70 to alert the receiving party that an incoming enterprise call is present and to provide its associated ANI/DNIS information. At step 560*b*, remote device 70 generates identification information to display to a user. The user can then input a selection (step 560*c*) to choose to accept the call (step 560*d*), divert the call to voicemail (step 560*e*) or deny the call (step 560*f*). This choice is sent to the server via a data signal (see e.g., FIG. 6C). If the call is accepted, the server 30 connects the call to the user via the PSTN connection (step 599). If the call is diverted to voicemail, the server 30 forwards the call to the voicemail box associated with the called extension (step 598). If the call is denied by the user, the server drops the call path to the PSTN (via a user setting option on the device 70) (step 597). It should be appreciated that the remote device 70 can be programmed to automatically accept the call, divert the call to voicemail or deny the call based on the received ANI/DNIS information.

It should be noted that the illustrated processing 500 is one example of how an incoming station-to-station call may be handled. Individual user preferences may alter the way the call is processed. It should be noted that in a preferred embodiment, the server 30 is signaling (and if accepted, calling) the remote device and pulsing the PBX 14 with the SERVER-PBX extension. This gives the server 30 control over the connections to the office telephone 12*a* and the remote device 70. It should also be noted that the server 30 can out dial (once the data signaling has occurred) several remote numbers, if so desired, and that the embodiments should not be limited to the dialing of one remote number. One user preference, for example, can be to route the calls sequentially (enterprise phone first, then remote device, or vice versa). Another preference may be to always send the calls only to the remote device 70.

At step 570, it is determined if the current ring count (i.e., current number of rings) exceeds the maximum ring count defined by the user. Since the server 30 is controlling the call at this time it can track the number of rings. This may be done in several ways. For example, the server 30 may keep track of the number of rings using a timer that corresponds to the typical timing associated with the selected ring count. That is, if the user ring count is two, the server 30 checks to see if a time equivalent to the time it takes for two rings to occur has elapsed. If this time has elapsed, then the current "ring count" exceeds the maximum count defined by the user. The server 30 can instead, count the rings being sent to the extension if desired.

If the ring count exceeds the maximum ring count, then the server 30 (if desired and determined by a user preference) forwards the call to the enterprise's voicemail (step 575). If the ring count does not exceed the maximum ring count, the server 30 determines if the call is answered at the PBX extension (step 580). The PBX 14 will issue an off-hook message to the server 30 if the appropriate office telephone is answered. If it is determined that the call is answered at the PBX extension, the server 30 drops the call's path to the remote device via the system 420 and maintains the path to the PBX 14 (step 585).

If at step 590, it is determined that the remote device was answered by the user, the server 30 drops the SERVER-PBX extension path to the PBX (step 595) and initiates the connection between the calling party and the remote device (step 599) via the PSTN. Server 30 will substantially seamlessly connect the incoming call to remote device 70 via the PSTN connection.

In accordance with the embodiments disclosed herein, it may be desired that the call to the remote device is actually answered by the user and not by a service of the wireless carrier. In known systems, wireless carriers often answer a call if there is a bad connection, the wireless channels are overloaded or for other reasons (such as initiating a wireless carrier's answering service). When the wireless carrier answers the call in these situations, the call would appear to server 30 as an "answered call" even if the remote user did not answer the call itself.

One way to distinguish a user answered call from a wireless service answered call is to prompt the user to transmit an acknowledgement signal such as a dual tone multi-frequency (DTMF) tone to the server 30 via the keypad of the remote device. Upon detecting the answered call, server 30 can send a voice message instructing the user to e.g., "press 1 to complete the call or press 2 to send caller to voicemail." If the DTMF tone is not received, then the server 30 presumes that the call was answered by the wireless carrier, or that the user does not want to answer the call which the server 30 treats as an unanswered call.

If the incoming call is deflected to voicemail, server 30 will connect the incoming call to an on-server or PBX voicemail box associated with the PBX extension. If the incoming call is denied, the call will be disconnected by server 30. If the call is not answered at the remote device in step 590, the process flow returns to step 570 to check whether the ring count has exceeded the maximum ring count. It should be noted that, if desired, the server 30 can play an interactive menu to the calling party, which allows the calling party to page the called party, leave a voicemail message or to transfer to an operator.

In accordance with an embodiment, the database of server 30 may also contain numerous system-defined user access rights and user modifiable preferences, which can alter the call processing disclosed herein. An office administrator may use the network computers 42a, 42b or a remote administration device 52 to set user access rights and priorities. The user may use the remote administration device 52 to set numerous user preferences. It is desirable that a Web-based or graphical user interface be used so that the user can easily access and set user preferences. The network computers 42a, 42b (or remote device 52) may also be used by the user if so desired.

Many enterprises have already provided wireless communications devices to their personnel. These wireless devices already have existing telephone numbers and are external to the enterprise PBX. Since the devices are already in use by personnel and their clients, the enterprise does not want to change their telephone numbers. There is a need to integrate these telephone numbers into the enterprise PBX. One way to integrate these telephone numbers would be to forward their unanswered calls to the voicemail. This can be accomplished whether the wireless telephone number is associated with a PBX extension or not.

For example, the enterprise can purchase additional DID telephone numbers from the telephone company (if necessary). These additional DID telephone numbers are stored in the database of the server 30 together with special routing instructions to route all calls directly to a user's voicemail box (or other destination as desired). The user of a wireless telephone can program the wireless telephone to forward unanswered calls to his associated DID telephone number. Alternatively, the user can have the wireless carrier forward unanswered calls to the DID telephone number as well. This way, any unanswered call to the wireless telephone will be forwarded to the server 30, which resolves the DID and forwards the call to the appropriate voicemail box. Using this feature, the likelihood is increased that the user will retrieve his messages since he can retrieve all of his messages through the voicemail. This also alleviates the need for the user to have a separate voicemail service from the wireless carrier, which may reduce the cost of the wireless service.

Embodiments described herein can be utilized in any number of different applications. One embodiment, for example, applies to a hotel having a large number of rooms with dedicated phones lines for each room to provide a second or "virtual phone line" without routing additional telephone lines or other wiring to the room. Each room would have the original hard-wired telephone extension that is connected to the enterprise PBX, as well as a wireless device (e.g., telephone or PDA) associated with the PBX extension (integrated using embodiments of the invention) serving as a second or virtual telephone line. If, for example, a guest of the hotel were using the hard-wired telephone line for his personal computer, he could still make and receive calls through the PBX with the wireless device. Thus, the this embodiment allows an enterprise to double its telephone lines without incurring the expense of additional wiring required to install a second line for the hotel rooms.

It should be appreciated that the system could utilize "voice over IP" communications (i.e., voice over a data network) with appropriate remote devices. Many of today's wireless telephones and PDA's have the ability to place and receive cellular and data (voice over IP) telephone calls and to access the Internet or other data network. It should be appreciated that any conventional remote device could be used with this system.

In one embodiment, remote device 70 can be implemented as mobile device 800, illustrated in FIG. 8. Mobile device 800 is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device 800 and how it communicates with other devices and host systems, reference will now be made to FIGS. 8 through 11.

Referring to FIG. 8, shown therein is a block diagram of an exemplary embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 receives messages from and sends messages to a wireless network 850. In this exemplary embodiment of the mobile device 800, the communication subsystem 804 is configured in accordance with the Global System for Mobile Communication (GSM) and General Packet Radio Services (GPRS) standards. The GSM/GPRS wireless network is used worldwide and it is expected that the standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with mobile device 800 is a GSM/GPRS wireless network in one exemplary implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications 822 and other device subsystems 824.

Some of the subsystems of the mobile device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 is not fully operational for communication with the wireless network 850. By inserting the SIM card/RUIM 826 into the SIM/RUIM interface 828, a subscriber can access all subscribed services. Services may include: web browsing and messaging such as e-mail, voice-mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI) as defined by ITU-T E.212. An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 800. Although current technology makes use of a battery, future technologies such as micro fuel cells may provide the power to the mobile device 800.

The mobile device 800 also includes an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the mobile device 800 with respect to such items. This can be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with. Examples of a wireless infrastructure and an enterprise system are given in FIGS. 10 and 11, which are described in more detail below.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy modules 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 830 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 is substantially similar, except that the received signals are output to the speaker 818, and signals for transmission are generated by the microphone 820. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 9:
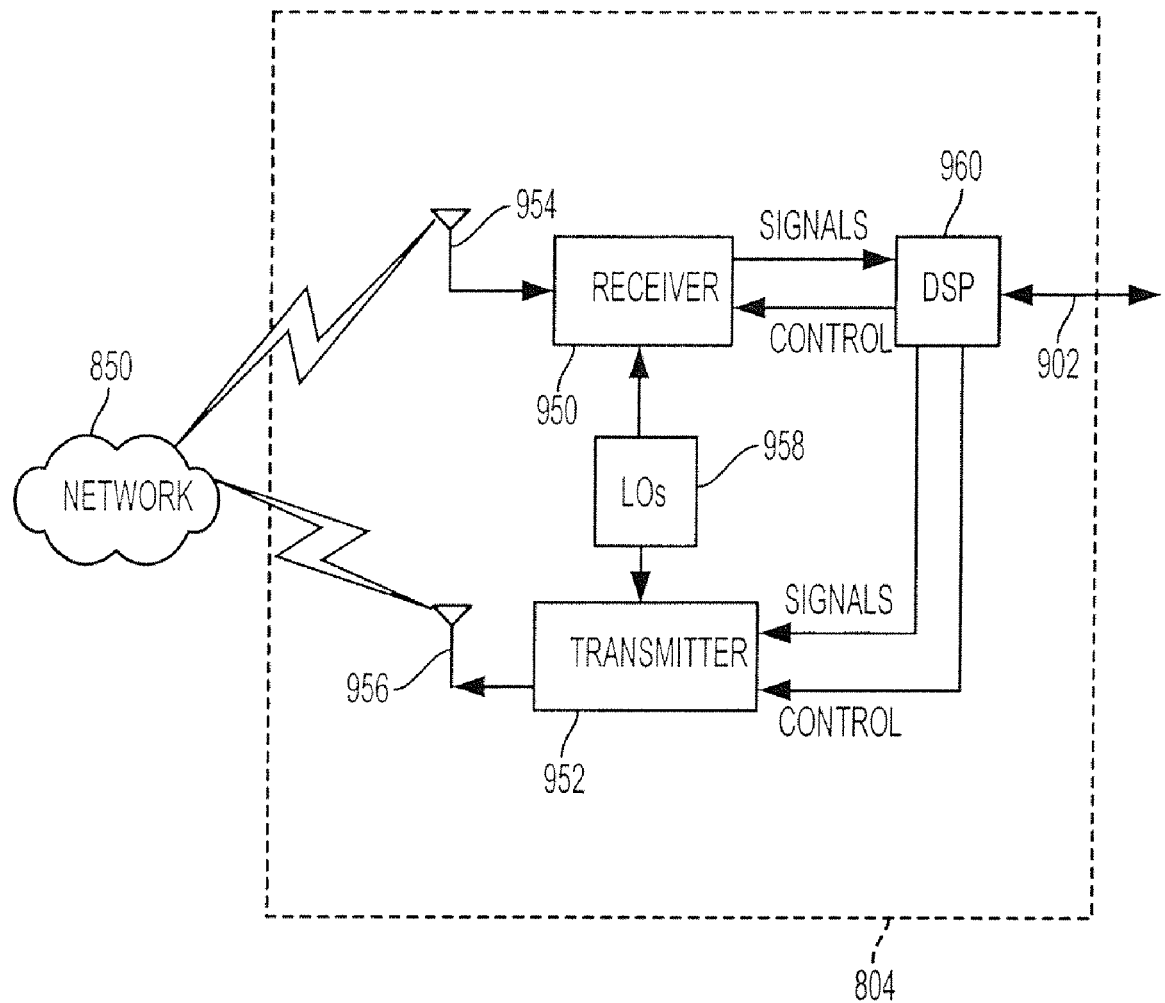
FIG. 9 is a block diagram of an exemplary communication subsystem component of the mobile device in accordance with an embodiment disclosed herein.

Referring to FIG. 9, an exemplary block diagram of the communication subsystem component 804 is shown. The communication subsystem 804 includes a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 is dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via, the antenna 956. The DSP 960 not only processes communication signals, but also provides for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

Figure 10:
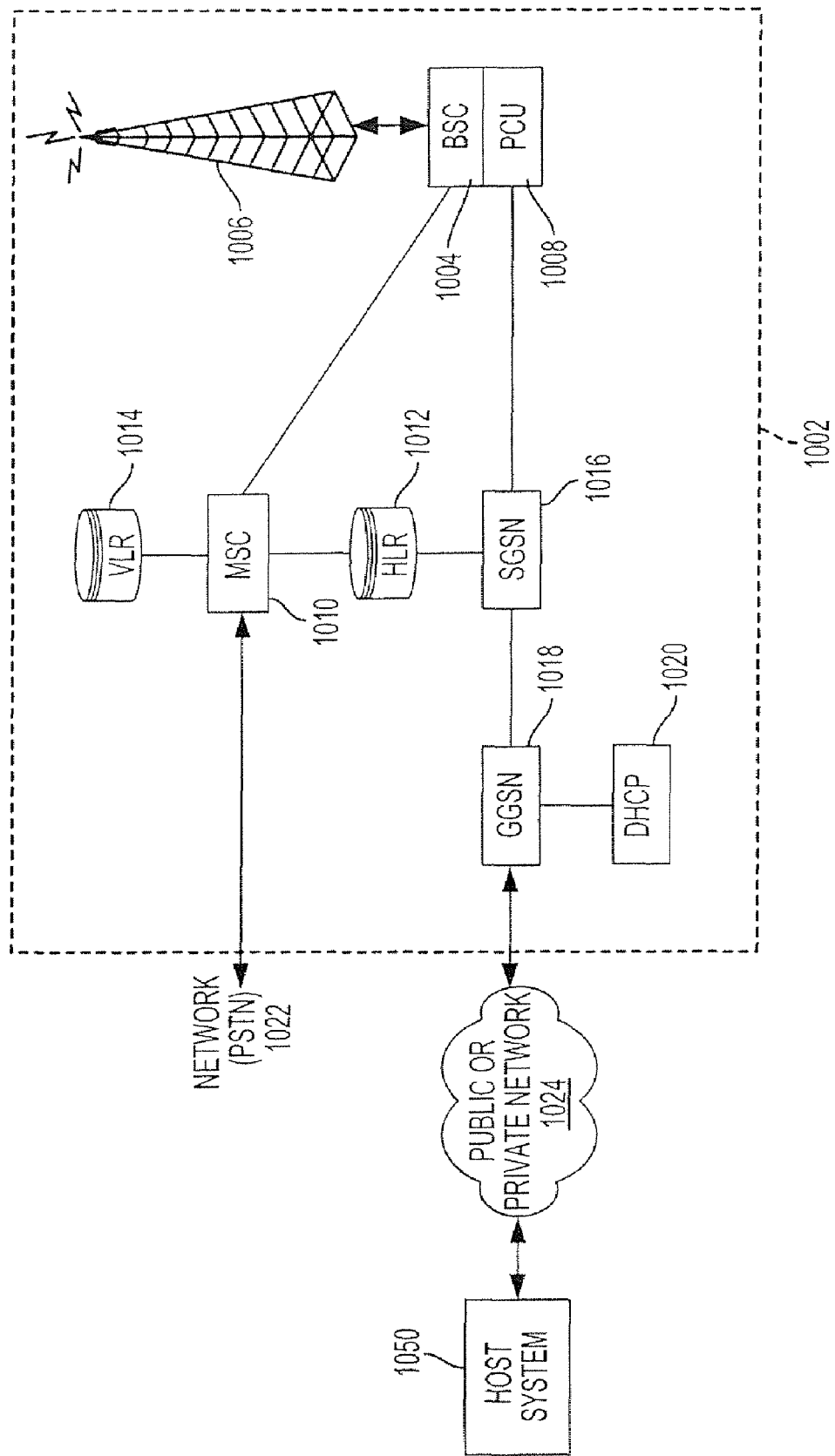
FIG. 10 is a block diagram of an exemplary node of a wireless network in accordance with an embodiment disclosed herein.

Referring to FIG. 10, a block diagram of an exemplary implementation of a node 1002 of the wireless network 850 is shown. In practice, the wireless network 850 comprises one or more nodes 1002. In conjunction with the connect module 844, the mobile device 800 can communicate with the node 1002 within the wireless network 850. In the exemplary implementation of FIG. 10, the node 1002 is configured in accordance with General Packet Radio Service (GPRS) and Global Systems for Mobile (GSM) technologies. The node 1002 includes a base station controller (BSC) 1004 with an associated tower station 1006, a Packet Control Unit (PCU) 1008 added for GPRS support in GSM, a Mobile Switching Center (MSC) 1010, a Home Location Register (HLR) 1012, a Visitor Location Registry (VLR) 1014, a Serving GPRS Support Node (SGSN) 1016, a Gateway GPRS Support Node (GGSN) 1018, and a Dynamic Host Configuration Protocol (DHCP) 1020. This list of components is not meant to be an exhaustive list of the components of every node 1002 within a GSM/GPRS network, but rather a list of components that are commonly used in communications through the network 850.

In a GSM network, the MSC 1010 is coupled to the BSC 1004 and to a landline network, such as a Public Switched Telephone Network (PSTN) 1022 to satisfy circuit switched requirements. The connection through the PCU 1008, the SGSN 1016 and the GGSN 1018 to a public or private network (Internet) 1024 (also referred to herein generally as a shared network infrastructure) represents the data path for GPRS capable mobile devices. In a GSM network extended with GPRS capabilities, the BSC 1004 also contains the Packet Control Unit (PCU) 1008 that connects to the SGSN 1016 to control segmentation, radio channel allocation and to satisfy packet switched requirements. To track the location of the mobile device 800 and availability for both circuit switched and packet switched management, the HLR 1012 is shared between the MSC 1010 and the SGSN 1016. Access to the VLR 1014 is controlled by the MSC 1010.

The station 1006 is a fixed transceiver station and together with the BSC 1004 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 1006. The fixed transceiver equipment normally performs such functions as modulation and possibly encoding and/or encryption of signals to be transmitted to the mobile device 800 in accordance with particular, usually predetermined, communication protocols and parameters, under control of its controller. The fixed transceiver equipment similarly demodulates and possibly decodes and decrypts, if necessary, any communication signals received from the mobile device 800 within its cell. Communication protocols and parameters may vary between different nodes. For example, one node may employ a different modulation scheme and operate at different frequencies than other nodes.

For all mobile devices 800 registered with a specific network, permanent configuration data such as a user profile is stored in the HLR 1012. The HLR 1012 also contains location information for each registered mobile device and can be queried to determine the current location of a mobile device. The MSC 1010 is responsible for a group of location areas and stores the data of the mobile devices currently in its area of responsibility in the VLR 1014. Further the VLR 1014 also contains information on mobile devices that are visiting other networks. The information in the VLR 1014 includes part of the permanent mobile device data transmitted from the HLR 1012 to the VLR 1014 for faster access. By moving additional information from a remote HLR 1012 node to the VLR 1014, the amount of traffic between these nodes can be reduced so that voice and data services can be provided with faster response times and at the same time requiring less use of computing resources.

The SGSN 1016 and the GGSN 1018 are elements added for GPRS support; namely packet switched data support, within GSM. The SGSN 1016 and the MSC 1010 have similar responsibilities within the wireless network 850 by keeping track of the location of each mobile device 800. The SGSN 1016 also performs security functions and access control for data traffic on the wireless network 800. The GGSN 1018 provides internetworking connections with external packet switched networks and connects to one or more SGSN's 1016 via an Internet Protocol (IP) backbone network operated within the network 850. During normal operations, a given mobile device 800 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 1020 connected to the GGSN 1018. There are many mechanisms for dynamic IP assignment, including using a combination of a Remote Authentication Dial-In User Service (RADIUS) server and a DHCP server. Once the GPRS Attach is complete, a logical connection is established from a mobile device 800, through the PCU 1008, and the SGSN 1016 to an Access Point Node (APN) within the GGSN 1018. The APN represents a logical end of an IP tunnel that can either access direct Internet compatible services or private network connections. The APN also represents a security mechanism for the network 850, insofar as each mobile device 800 must be assigned to one or more APNs and mobile devices 800 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 850. To maximize use of the PDP Contexts, the network 800 will run an idle timer for each PDP Context to determine if there is a lack of activity. When a mobile device 800 is not using its PDP Context, the PDP Context can be de-allocated and the IP address returned to the IP address pool managed by the DHCP server 1020.

Figure 11:
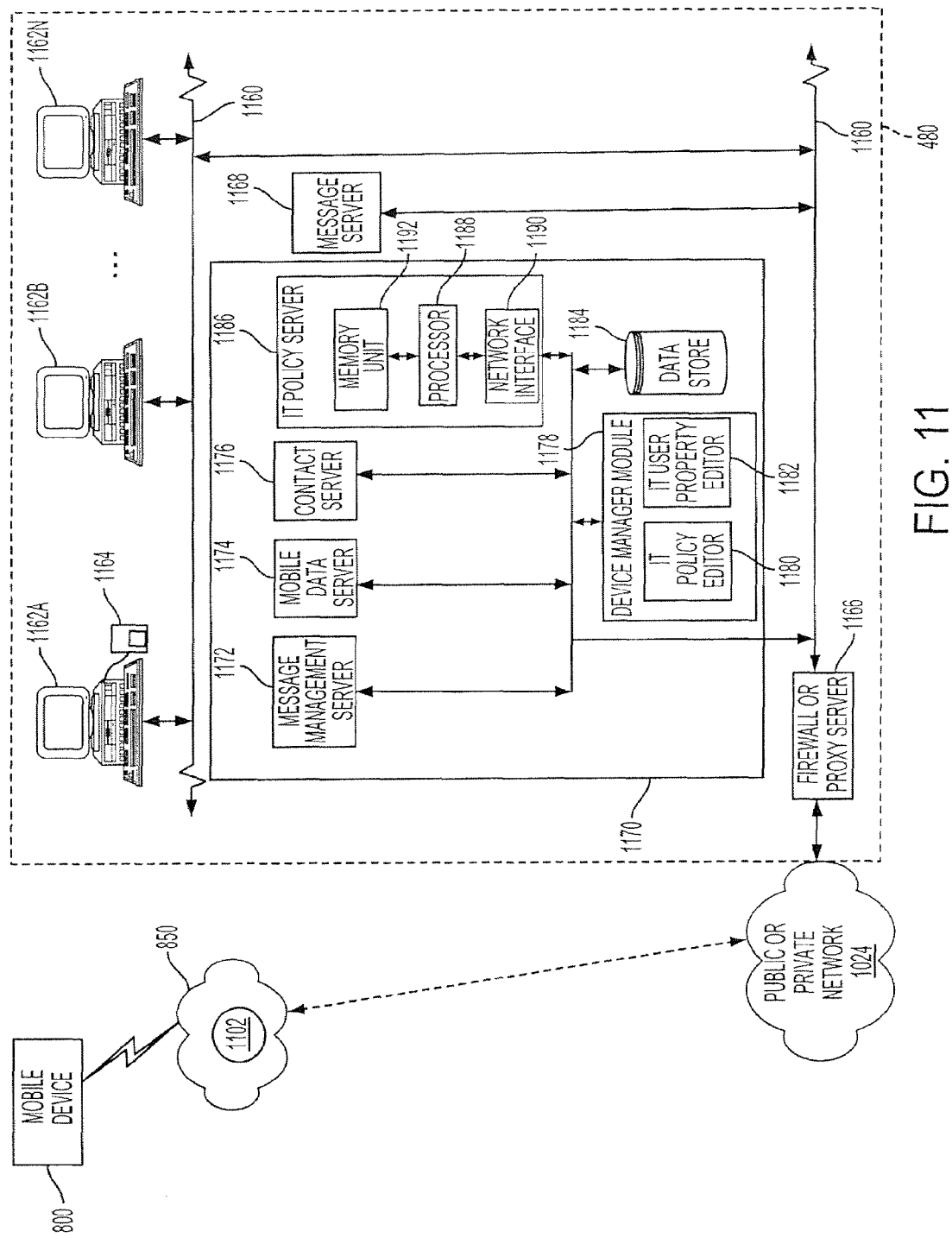
FIG. 11 is a block diagram illustrating components of a host system in one exemplary configuration for use with the wireless network of FIG. 10 and the mobile device of FIG. 8.

Referring to FIG. 11, shown therein is a block diagram illustrating components of an exemplary configuration of a host system 480 that the mobile device 800 can communicate with in conjunction with the connect module 844. The host system 480 will typically be a corporate enterprise or other local area network (LAN), but may also be a home office computer or some other private system, for example, in variant implementations. In this example shown in FIG. 11, the host system 480 is depicted as a LAN of an organization to which a user of the mobile device 800 belongs. Typically, a plurality of mobile devices can communicate wirelessly with the host system 480 through one or more nodes 1002 of the wireless network 850.

The host system 480 comprises a number of network components connected to each other by a network 1160. For instance, a user's desktop computer 1162a with an accompanying cradle 1164 for the user's mobile device 800 is situated on a LAN connection. The cradle 1164 for the mobile device 800 can be coupled to the computer 1162a by a serial or a Universal Serial Bus (USB) connection, for example. Other user computers 1162b-1162n are also situated on the network 1160, and each may or may not be equipped with an accompanying cradle 1164. The cradle 1164 facilitates the loading of information (e.g. PIM data, private symmetric encryption keys to facilitate secure communications) from the user computer 1162a to the mobile device 800, and may be particularly useful for bulk information updates often performed in initializing the mobile device 800 for use. The information downloaded to the mobile device 800 may include certificates used in the exchange of messages.

It will be understood by persons skilled in the art that the user computers 1162a-1162n will typically also be connected to other peripheral devices, such as printers, etc. which are not explicitly shown in FIG. 11. Furthermore, only a subset of network components of the host system 480 are shown in FIG. 11 for ease of exposition, and it will be understood by persons skilled in the art that the host system 480 will comprise additional components that are not explicitly shown in FIG. 11 for this exemplary configuration. More generally, the host system 480 may represent a smaller part of a larger network (not shown) of the organization, and may comprise different components and/or be arranged in different topologies than that shown in the exemplary embodiment of FIG. 11.

To facilitate the operation of the mobile device 800 and the wireless communication of messages and message-related data between the mobile device 800 and components of the host system 480, a number of wireless communication support components 1170 can be provided. In some implementations, the wireless communication support components 1170 can include a message management server 1172, a mobile data server 1174, a contact server 1176, and a device manager module 1178. The device manager module 1178 includes an IT Policy editor 1180 and an IT user property editor 1182, as well as other software components for allowing an IT administrator to configure the mobile devices 800. In an alternative embodiment, there may be one editor that provides the functionality of both the IT policy editor 1180 and the IT user property editor 1182. The support components 1170 also include a data store 1184, and an IT policy server 1186. The IT policy server 286 includes a processor 1188, a network interface 1190 and a memory unit 1192. The processor 1188 controls the operation of the IT policy server 1186 and executes functions related to the standardized IT policy as described below. The network interface 1190 allows the IT policy server 1186 to communicate with the various components of the host system 480 and the mobile devices 800. The memory unit 1192 can store functions used in implementing the IT policy as well as related data. Those skilled in the art know how to implement these various components. Other components may also be included as is well known to those skilled in the art. Further, in some implementations, the data store 1184 can be part of any one of the servers.

In this exemplary embodiment, the mobile device 800 communicates with the host system 480 through node 1002 of the wireless network 850 and a shared network infrastructure 1124 such as a service provider network or the public Internet. Access to the host system 480 may be provided through one or more routers (not shown), and computing devices of the host system 480 may operate from behind a firewall or proxy server 1166. The proxy server 1166 provides a secure node and a wireless internet gateway for the host system 480. The proxy server 1166 intelligently routes data to the correct destination server within the host system 480.

In some implementations, the host system 480 can include a wireless VPN router (not shown) to facilitate data exchange between the host system 480 and the mobile device 800. The wireless VPN router allows a VPN connection to be established directly through a specific wireless network to the mobile device 800. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 800 in this alternative implementation.

Messages intended for a user of the mobile device 800 are initially received by a message server 1168 of the host system 480. Such messages may originate from any number of sources. For instance, a message may have been sent by a sender from the computer 1162b within the host system 480, from a different mobile device (not shown) connected to the wireless network 850 or a different wireless network, or from a different computing device, or other device capable of sending messages, via the shared network infrastructure 1124, possibly through an application service provider (ASP) or Internet service provider (ISP), for example.

The message server 1168 typically acts as the primary interface for the exchange of messages, particularly e-mail messages, within the organization and over the shared network infrastructure 1124. Each user in the organization that has been set up to send and receive messages is typically associated with a user account managed by the message server 1168. Some exemplary implementations of the message server 1168 include a Microsoft Exchange™ server, a Lotus Domino™ server, a Novell Groupwise™ server, or another suitable mail server installed in a corporate environment. In some implementations, the host system 480 may comprise multiple message servers 1168. The message server 1168 may also be adapted to provide additional functions beyond message management, including the management of data associated with calendars and task lists, for example.

When messages are received by the message server 1168, they are typically stored in a data store associated with the message server 1168. In at least some embodiments, the data store may be a separate hardware unit, such as data store 1184, that the message server 1168 communicates with. Messages can be subsequently retrieved and delivered to users by accessing the message server 1168. For instance, an e-mail client application operating on a user's computer 1162a may request the e-mail messages associated with that user's account stored on the data store associated with the message server 1168. These messages are then retrieved from the data store and stored locally on the computer 1162a. The data store associated with the message server 1168 can store copies of each message that is locally stored on the mobile device 800. Alternatively, the data store associated with the message server 1168 can store all of the messages for the user of the mobile device 800 and only a smaller number of messages can be stored on the mobile device 800 to conserve memory. For instance, the most recent messages (i.e., those received in the past two to three months for example) can be stored on the mobile device 800.

When operating the mobile device 800, the user may wish to have e-mail messages retrieved for delivery to the mobile device 800. The message application 838 operating on the mobile device 800 may also request messages associated with the user's account from the message server 1168. The message application 838 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 800 is assigned its own e-mail address, and messages addressed specifically to the mobile device 800 are automatically redirected to the mobile device 800 as they are received by the message server 1168.

The message management server 1172 can be used to specifically provide support for the management of messages, such as e-mail messages, that are to be handled by mobile devices. Generally, while messages are still stored on the message server 1168, the message management server 1172 can be used to control when, if, and how messages are sent to the mobile device 800. The message management server 1172 also facilitates the handling of messages composed on the mobile device 800, which are sent to the message server 1168 for subsequent delivery.

For example, the message management server 1172 may monitor the user's "mailbox" (e.g. the message store associated with the user's account on the message server 1168) for new e-mail messages, and apply user-definable filters to new messages to determine if and how the messages are relayed to the user's mobile device 800. The message management server 1172 may also compress and encrypt new messages (e.g. using an encryption technique such as Data Encryption Standard (DES), Triple DES, or Advanced Encryption Standard (AES)) and push them to the mobile device 800 via the shared network infrastructure 1124 and the wireless network 850. The message management server 1172 may also receive messages composed on the mobile device 800 (e.g. encrypted using Triple DES), decrypt and decompress the composed messages, re-format the composed messages if desired so that they will appear to have originated from the user's computer 1162a, and re-route the composed messages to the message server 1168 for delivery.

Certain properties or restrictions associated with messages that are to be sent from and/or received by the mobile device 800 can be defined (e.g. by an administrator in accordance with IT policy) and enforced by the message management server 1172. These may include whether the mobile device 800 may receive encrypted and/or signed messages, minimum encryption key sizes, whether outgoing messages must be encrypted and/or signed, and whether copies of all secure messages sent from the mobile device 800 are to be sent to a pre-defined address, for example.

The message management server 1172 may also be adapted to provide other control functions, such as only pushing certain message information or pre-defined portions (e.g. "blocks") of a message stored on the message server 1168 to the mobile device 800. For example, in some cases, when a message is initially retrieved by the mobile device 800 from the message server 1168, the message management server 1172 may push only the first part of a message to the mobile device 800, with the part being of a pre-defined size (e.g. 2 KB). The user can then request that more of the message be delivered in similar-sized blocks by the message management server 1172 to the mobile device 800, possibly up to a maximum pre-defined message size. Accordingly, the message management server 1172 facilitates better control over the type of data and the amount of data that is communicated to the mobile device 800, and can help to minimize potential waste of bandwidth or other resources.

The mobile data server 1174 encompasses any other server that stores information that is relevant to the corporation. The mobile data server 1174 may include, but is not limited to, databases, online data document repositories, customer relationship management (CRM) systems, or enterprise resource planning (ERP) applications.

The contact server 1176 can provide information for a list of contacts for the user in a similar fashion as the address book on the mobile device 800. Accordingly, for a given contact, the contact server 1176 can include the name, phone number, work address and e-mail address of the contact, among other information. The contact server 1176 can also provide a global address list that contains the contact information for all of the contacts associated with the host system 480.

It will be understood by persons skilled in the art that the message management server 1172, the mobile data server 1174, the contact server 1176, the device manager module 1178, the data store 1184 and the IT policy server 1186 do not need to be implemented on separate physical servers within the host system 480. For example, some or all of the functions associated with the message management serve 1172 may be integrated with the message server 1168, or some other server in the host system 480. Alternatively, the host system 840 may comprise multiple message management servers 1172, particularly in variant implementations where a large number of mobile devices need to be supported.

Alternatively, in some embodiments, the IT policy server 1186 can provide the IT policy editor 1180, the IT user property editor 1182 and the data store 1184. In some cases, the IT policy server 1186 can also provide the device manager module 1178. The processor 1188 can execute the editors 1180 and 1182. In some cases, the functionality of the editors 1180 and 1182 can be provided by a single editor. In some cases, the memory unit 1192 can provide the data store 1184.

The device manager module 1178 provides an IT administrator with a graphical user interface with which the IT administrator interacts to configure various settings for the mobile devices 800. As mentioned, the IT administrator can use IT policy rules to define behaviors of certain applications on the mobile device 800 that are permitted such as phone, web browser or Instant Messenger use. The IT policy rules can also be used to set specific values for configuration settings that an organization requires on the mobile devices 800 such as auto signature text, WLAN/VoIP/VPN configuration, security requirements (e.g. encryption algorithms, password rules, etc.), specifying themes or applications that are allowed to run on the mobile device 800, and the like.

Another embodiment described herein implements priority preemption to any device associated with the server 30 used in the enterprise network. This includes any voice, data and/or satellite devices associated with a telephone number of the enterprise network. This allows priority users to preempt existing communications and communicate with certain individuals even though that individual is using a wireless telephone or other remote device. To implement this priority preemption feature, the server 30 should be programmed to recognize a special dialing pattern, data message or other input from one of the many devices that the high priority user may be using. This unique pattern whether it is a dialing pattern, data message or other input is referred to herein as the preemption signal. The priority preemption signal proceeds a telephone number in which the high priority user wishes to call. If the individual associated with the telephone number is already on another call, then the priority preemption may be invoked as follows.

Figure 12:
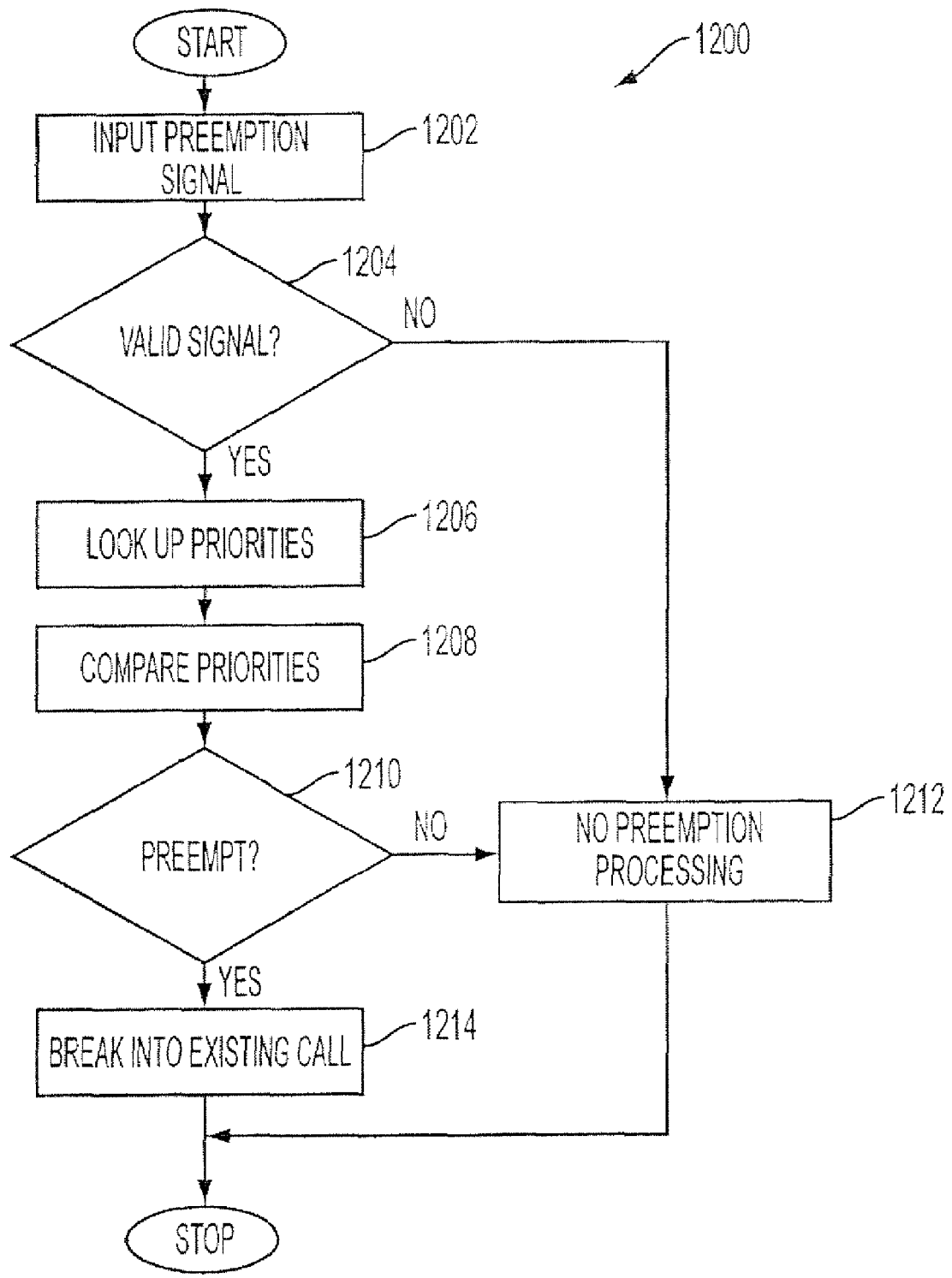
FIG. 12 illustrates exemplary priority preemption processing performed by an embodiment disclosed herein.

FIG. 12 illustrates priority preemption processing 1200 performed by an embodiment of the invention. The processing 1200 begins when the server unit detects a preemption signal and a dialed telephone number (step 1202). The server unit checks the preemption signal to determine if it is a valid signal (step 1204). If valid, the server unit uses the signal to determine the priority of the caller, the individual associated with the dialed telephone number, and if possible, the priority of the individual on the active call (step 1206). The server 30 compares the priorities to determine if the person attempting to preempt the call has the highest priority (step 1210) and if so, sends a data signal through system 420 to the remote device (step 1214). If the remote device accepts the preemption, server 30 will withdraw the connected call from the remote device and connect the new priority call through the PSTN connection. Due to the flexibility of the server unit, priority preemption may be implemented using DTMF, IVR, web based or micro-browser communications.

If the person attempting to preempt the call does not have the highest priority (step 1210) or if the preemption signal is invalid (step 1204), then additional call processing may be performed (step 1212). This additional processing may be a prompt, voice or text message or other alert to the caller to indicate that the preemption cannot occur at this time. The processing may also include a menu of options in which the caller can choose to leave a message, try again, or merely hang up. It should be appreciated that priority preemption may be implemented in any manner desired by the enterprise and that the embodiment is not limited to the specific steps illustrated in FIG. 12.

While preferred embodiments have been specifically described and illustrated herein, it should be apparent that many modifications to the embodiments and implementations can be made. For example, while the preferred embodiments illustrated herein have been limited to the processing of voice (packet or circuit switched) calls, it should be easily apparent that any form of call (e.g., audio, video, data) may be processed through server 30 to any communication device (e.g., cellular phone, pager, office/residential landline telephone, computer terminal, personal digital assistant (PDA), RIM device, etc.). The individual method steps of the exemplary operational flows illustrated in FIGS. 6A-7A may be interchanged in order, combined, replaced or even added. Any number of different operations not illustrated herein may be performed during the processing. Moreover, the method steps may be performed by hardware, software, firmware or any combinations of hardware, software, firmware or logic elements.

In addition, while the illustrated embodiments have demonstrated implementations using PBX-based communication systems, it should be readily apparent that the server module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the embodiments do not need a PBX to operate or to perform any of the processing illustrated in FIGS. 6A-7A. All that is required is a properly programmed server 30.

It should be apparent that, while only PRI lines (e.g., between PBX 14 and server 30, between PBX 14 and PSTN 16) have been illustrated in discussing preferred embodiments, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used. It should be noted that the server 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint/Nextel, etc.) depending on the communication devices registered with the system.

The modules described herein such as the modules making up server 30, as well as server 30 and PBX 14 themselves, may be one or more hardware, software, or hybrid components residing in (or distributed among) one or more local or remote systems. It should be readily apparent that the modules may be combined (e.g., server 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with server 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components. Accordingly, the claimed invention is not to be seen as limited by the foregoing description, but is only limited by the scope of the appended claims.

What is claimed as new and desired to be protected by Letters Patent of the United States is:

1. A method of routing an outbound communication initiated by a wireless device through an enterprise communication network, the method comprises:
   registering the wireless device with a server associated with the enterprise communication network;
   inputting a first data signal from the registered wireless device, the first data signal comprising a first device indicator of an intended recipient device of the outbound communication;
   translating the first device indicator into a first address suitable for establishing a first communication path with the intended recipient device;

establishing the first communication path using the first address;

establishing a second communication path to the wireless device; and connecting the first and second communication paths to route the outbound communication from the wireless device to the recipient.

2. The method of claim 1, wherein the registering step comprises:

receiving a second data signal from the wireless device, the second data signal comprising a second device indicator associated with the wireless device;

translating the second indicator into an second address suitable for establishing a second communication path with the wireless device;

retrieving access rights associated with the wireless device based on second address;

determining from the retrieved access rights whether the wireless device has permission to make the outbound communication; and transmitting a third data signal to the wireless device indicating whether permission has been granted or not.

3. The method of claim 2, wherein the second device indicator is a direct inward dial telephone number and the second address is a private number plan number associated with the network.

4. The method of claim 2, wherein the second device indicator is a SIP URI and the second address is a private number plan number associated with the network.

5. The method of claim 2, wherein the second device indicator is an E.164 number and the second address is a private number plan number associated with the network.

6. The method of claim 2, wherein the second device indicator is a private number plan number associated with the network and the second address is a SIP URI.

7. The method of claim 2, wherein the second device indicator is a private number plan number associated with the network and the second address is a direct inward dial number.

8. The method of claim 2, wherein the second device indicator is a private number plan number associated with the network and the second address is an E.164 number.

9. The method of claim 1, wherein the first device indicator is a direct inward dial telephone number and the first address is a private number plan number associated with the network.

10. The method of claim 1, wherein the first device indicator is a SIP URI and the first address is a private number plan number associated with the network.

11. The method of claim 1, wherein the first device indicator is an E.164 number and the first address is a private number plan number associated with the network.

12. The method of claim 1, wherein the first device indicator is a private number plan number associated with the network and the first address is a SIP URI.

13. The method of claim 1, wherein the first device indicator is a private number plan number associated with the network and the first address is a direct inward dial number.

14. The method of claim 1, wherein the first device indicator is a private number plan number associated with the network and the first address is an E.164 number.

15. The method of claim 1, wherein the first and second communication paths are packet switched communication paths.

16. The method of claim 1, wherein the first and second communication paths are circuit switched communication paths.

* * * * *